(12) United States Patent  
Sasaki et al.

(10) Patent No.: US 8,498,080 B2  
(45) Date of Patent: Jul. 30, 2013

(54) MAGNETIC HEAD FOR PERPENDICULAR MAGNETIC RECORDING THAT INCLUDES A SENSOR FOR DETECTING CONTACT WITH A RECORDING MEDIUM

(75) Inventors: Yoshitaka Sasaki, Santa Clara, CA (US); Hiroyuki Ito, Milpitas, CA (US); Kazuki Sato, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 328 days.

(21) Appl. No.: 13/035,234

(22) Filed: Feb. 25, 2011

(65) Prior Publication Data

US 2012/0218663 A1 Aug. 30, 2012

(51) Int. Cl.
*G11B 5/17* (2006.01)
*G11B 5/187* (2006.01)

(52) U.S. Cl.
USPC ............ 360/125.31; 360/123.03; 360/123.05; 360/125.12; 360/125.13; 360/125.14; 360/125.15; 360/125.25; 360/125.3; 360/125.68; 360/125.69; 360/125.7

(58) Field of Classification Search
USPC ............ 360/123.02, 123.04, 123.05, 123.03, 360/125.03, 125.12, 125.13, 125.14, 125.15, 360/125.17, 125.22, 125.23, 125.24, 125.25, 360/125.3, 125.31, 125.67, 125.68, 125.69, 360/125.7
See application file for complete search history.

(56) References Cited

U.S. PATENT DOCUMENTS

| 6,954,340 | B2 | 10/2005 | Shukh et al. |
| 7,609,479 | B2 | 10/2009 | Sasaki et al. |
| 2005/0128637 | A1 | 6/2005 | Johnston et al. |
| 2005/0190479 | A1* | 9/2005 | Terris et al. ................... 360/59 |
| 2008/0030905 | A1* | 2/2008 | Yamanaka et al. ............ 360/313 |
| 2010/0309581 | A1* | 12/2010 | Wu et al. ................... 360/123.12 |
| 2011/0267715 | A1* | 11/2011 | Heim et al. ................... 360/59 |
| 2012/0218662 | A1* | 8/2012 | Sasaki et al. ............. 360/123.12 |
| 2012/0257304 | A1* | 10/2012 | Sasaki et al. ............. 360/123.12 |
| 2012/0314323 | A1* | 12/2012 | Sasaki et al. ............. 360/123.05 |
| 2013/0038966 | A1* | 2/2013 | Sasaki et al. ............. 360/123.04 |
| 2013/0050867 | A1* | 2/2013 | Yamane et al. ................. 360/59 |

FOREIGN PATENT DOCUMENTS

JP A-2008-77751 4/2008

* cited by examiner

*Primary Examiner* — Jefferson Evans
(74) *Attorney, Agent, or Firm* — Oliff & Berridge, PLC

(57) ABSTRACT

A magnetic head includes a main pole, a write shield, a return path section, a heater that generates heat for making part of a medium facing surface protrude, and a sensor that detects contact of the part of the medium facing surface with a recording medium. The return path section includes: a yoke layer located backward of the main pole along the direction of travel of the recording medium; a first coupling part coupling the yoke layer and the write shield to each other; and a second coupling part located away from the medium facing surface and coupling the yoke layer and the main pole to each other. The first coupling part has an end face facing toward the yoke layer. This end face includes a middle portion spaced from the yoke layer and facing the yoke layer, and two side portions located on opposite sides of the middle portion in a track width direction and in contact with the yoke layer. The sensor is located between the middle portion and the yoke layer.

9 Claims, 13 Drawing Sheets

MAGNETIC HEAD FOR PERPENDICULAR MAGNETIC RECORDING THAT INCLUDES A SENSOR FOR DETECTING CONTACT WITH A RECORDING MEDIUM

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a sensor for detecting contact with a recording medium.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head unit of the perpendicular magnetic recording system be smaller in track width and improved in write characteristics such as an overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

Providing a write shield near the main pole is effective for preventing the aforementioned skew-induced adjacent track erase and increasing the recording density. For example, U.S. Pat. No. 6,954,340 B2 and U.S. Patent Application Publication No. 2005/0128637 A1 describe a magnetic head including a write shield having an end face that is located in the medium facing surface to wrap around an end face of the main pole.

A magnetic head including a write shield is typically provided with one or more return path sections for connecting the write shield to a part of the main pole away from the medium facing surface. The one or more return path sections include a yoke layer extending in a direction perpendicular to the medium facing surface. The write shield and the one or more return path sections function to capture a magnetic flux that is produced from the end face of the main pole and that expands in directions other than the direction perpendicular to the plane of the recording medium, and to thereby prevent the magnetic flux from reaching the recording medium. The write shield and the one or more return path sections also function to allow a magnetic flux that has been produced from the end face of the main pole and has magnetized the recording medium to flow back to the main pole. Thus, the magnetic head including the write shield allows prevention of the adjacent track erase and allows a further improvement in recording density.

U.S. Pat. No. 6,954,340 B2 and U.S. Patent Application Publication No. 2005/0128637 A1 describe a magnetic head including, as the aforementioned one or more return path sections, a return path section located forward along the direction of travel of the recording medium (i.e., on the trailing end side) relative to the main pole, and a return path section located backward along the direction of travel of the recording medium (i.e., on the leading end side) relative to the main pole.

For a magnetic disk drive, it is desired that the distance from the read head unit and the write head unit to the surface of the recording medium be small and constant in order to suppress a decrease in reading capability and writing capability. To meet this, there has been proposed a slider that includes a heater to be energized for heat generation, as disclosed in, for example, JP-A-2008-77751. In the slider including the heater, part of the magnetic head expands with the heat generated by the heater, so that the medium facing surface protrudes in part. This makes it possible to reduce the distance from the read head unit and the write head unit to the surface of the recording medium, and to control the distance from the read head unit and the write head unit to the surface of the recording medium by heater control.

When part of the medium facing surface is protruded as described above, it becomes easier for the part of the medium facing surface to make contact with the surface of the recording medium. The recording medium sometimes has minute projections on its surface. In such a case, part of the medium facing surface may make contact with the projections on the surface of the recording medium, though not with the areas other than the projections. If the recording medium is wavy in the surface, part of the medium facing surface can make contact with certain areas on the surface of the recording medium. Since the contact of part of the medium facing surface with the surface of the recording medium hinders normal read and write operations, it is necessary to avoid such a contact.

Thus, prior to shipment of the magnetic disk drive product, a test may be performed to detect the areas of the surface of the recording medium with which part of the medium facing surfaces makes contact, with the amount of protrusion of the part of the medium facing surface maintained constant. This makes it possible to manufacture a product that is programmed to reduce the amount of protrusion of the part of the medium facing surface when the magnetic head passes the areas of contact detected by the test, so as to avoid contact.

The foregoing test needs a sensor for detecting a contact between part of the medium facing surface and the surface of the recording medium. JP-A-2008-77751 describes a slider including a heat generating resistance part that functions as both a heater and a sensor, and a thermal conduction layer disposed above or under the heat generating resistance part.

Here, consider a case where a heater and a sensor are provided in a magnetic head that is configured so that the write head unit is located forward of the read head unit along the direction of travel of the recording medium and the write head unit includes a return path section located backward of the main pole along the direction of travel of the recording medium. In this case, it is appropriate to dispose the sensor between the read head unit and the main pole. If so configured, however, the following problem arises due to the presence of the yoke layer of the return path section.

First, the sensor needs to be disposed in the vicinity of the area of the medium facing surface where the amount of protrusion is large. It is therefore preferred that in the vicinity of sensor there exist a layer that makes a large amount of expansion toward the recording medium when subjected to the heat generated by the heater. Suppose that the sensor is provided between the read head unit and the main pole in a magnetic head that has the aforementioned return path section. In such a case, since the yoke layer of the return path section lies between the read head unit and the main pole at a position backward of the main pole along the direction of travel of the recording medium, it would be advantageous if the yoke layer could make a large expansion toward the recording medium with the heat generated by the heater. The yoke layer, however, is connected to the write shield and the main pole. This suppresses expansion of the yoke layer toward the recording medium. As thus described, if the sensor is provided between the read head unit and the main pole in the magnetic head having a yoke layer at a position backward of the main pole along the direction of travel of the recording medium, the yoke layer prevents the medium facing surface from protruding in part. This gives rise to the problem that it becomes difficult to control the distance between part of the medium facing surface and the surface of the recording medium and to detect contact of the part of the medium facing surface with the recording medium effectively.

OBJECT AND SUMMARY OF THE INVENTION

It is an object of the present invention to provide a magnetic head for perpendicular magnetic recording that is capable of controlling the distance between part of the medium facing surface and the surface of the recording medium and detecting contact of the part of the medium facing surface with the recording medium, without hindrance to protrusion of part of the medium facing surface even if a yoke layer connected to a write shield and a main pole lies at a position backward of the main pole along the direction of travel of the recording medium.

A magnetic head for perpendicular magnetic recording of the present invention includes: a medium facing surface that faces a recording medium; a coil that produces a magnetic field corresponding to data to be written on the recording medium; and a main pole. The main pole has an end face located in the medium facing surface, allows a magnetic flux corresponding to the magnetic field produced by the coil to pass, and produces a write magnetic field for writing the data on the recording medium by means of a perpendicular magnetic recording system.

The magnetic head of the present invention further includes: a write shield made of a magnetic material and having an end face located in the medium facing surface; a gap part made of a nonmagnetic material and disposed between the main pole and the write shield; a first return path section made of a magnetic material; at least one heater that generates heat for making part of the medium facing surface protrude; and a sensor that detects contact of the part of the medium facing surface with the recording medium.

The end face of the write shield includes a first end face portion located forward of the end face of the main pole along the direction of travel of the recording medium. The first return path section includes: a yoke layer located backward of the main pole along the direction of travel of the recording medium; a first coupling part that couples the yoke layer and the write shield to each other; and a second coupling part that is located away from the medium facing surface and couples the yoke layer and the main pole to each other.

The first coupling part has an end face facing toward the yoke layer. The end face of the first coupling part includes a middle portion that is spaced from the yoke layer and faces the yoke layer, and two side portions that are located on opposite sides of the middle portion in a track width direction and in contact with the yoke layer. The sensor is located between the yoke layer and the middle portion of the end face of the first coupling part.

The magnetic head of the present invention may include a first space defined by the main pole, the gap part, the write shield and the first return path section. In this case, the coil may include a first portion passing through the first space.

The magnetic head of the present invention may further include a second return path section made of a magnetic material. The second return path section may have an end face that is located away from the medium facing surface and in contact with the main pole. The second return path section may be located forward of the main pole along the direction of travel of the recording medium and may connect the write shield and the main pole to each other. In this case, the magnetic head may include a first space defined by the main pole, the gap part, the write shield and the first return path section, and a second space defined by the main pole, the gap part, the write shield and the second return path section. The coil may include a first portion passing through the first space and a second portion passing through the second space.

In the magnetic head of the present invention, the end face of the write shield may further include a second, a third, and a fourth end face portion. The second end face portion may be located backward of the end face of the main pole along the direction of travel of the recording medium. The third and fourth end face portions may be located on opposite sides of the end face of the main pole in a track width direction.

In the magnetic head of the present invention, the sensor may be a resistor that varies in resistance with a change in its own temperature which occurs when part of the medium facing surface makes contact with the recording medium.

In the magnetic head of the present invention, the at least one heater may include a first heater that is located backward of the sensor along the direction of travel of the recording medium. In this case, the at least one heater may further include a second heater that is located forward of the sensor along the direction of travel of the recording medium.

The magnetic head of the present invention may further include a read head unit located backward of the yoke layer along the direction of travel of the recording medium. The read head unit may include a read element that reads data written on the recording medium, and first and second read shield layers that are disposed such that the read element is interposed therebetween.

In the magnetic head for perpendicular magnetic recording of the present invention, the first coupling part which couples the yoke layer and the write shield to each other has an end face facing toward the yoke layer. This end face of the first coupling part includes the middle portion spaced from the yoke layer and facing the yoke layer, and the two side portions located on opposite sides of the middle portion in the track width direction and in contact with the yoke layer. Thus, the yoke layer is in contact with the two side portions of the end face of the first coupling part, but not with the middle portion which lies between the two side portions. Consequently, according to the present invention, it is possible to make the amount of expansion of at least part of the yoke layer toward the recording medium larger as compared with a case where the entire end face of the first coupling part is in contact with the yoke layer. Furthermore, in the present invention, the sensor is disposed between the yoke layer and the middle portion of the end face of the first coupling part. That is, the sensor is disposed near the part of the yoke layer that makes a large amount of expansion toward the recording medium. With these features, the present invention makes it possible to control the distance between part of the medium facing surface and the surface of the recording medium and to detect contact of the part of the medium facing surface with the recording medium, without hindrance to protrusion of part of the medium facing surface even if the yoke layer connected to the write shield and the main pole lies at a position backward of the main pole along the direction of travel of the recording medium.

Other objects, features and advantages of the present invention will become fully apparent from the following description.

DETAILED DESCRIPTION OF THE PREFERRED EMBODIMENTS

First Embodiment

Figure 1:
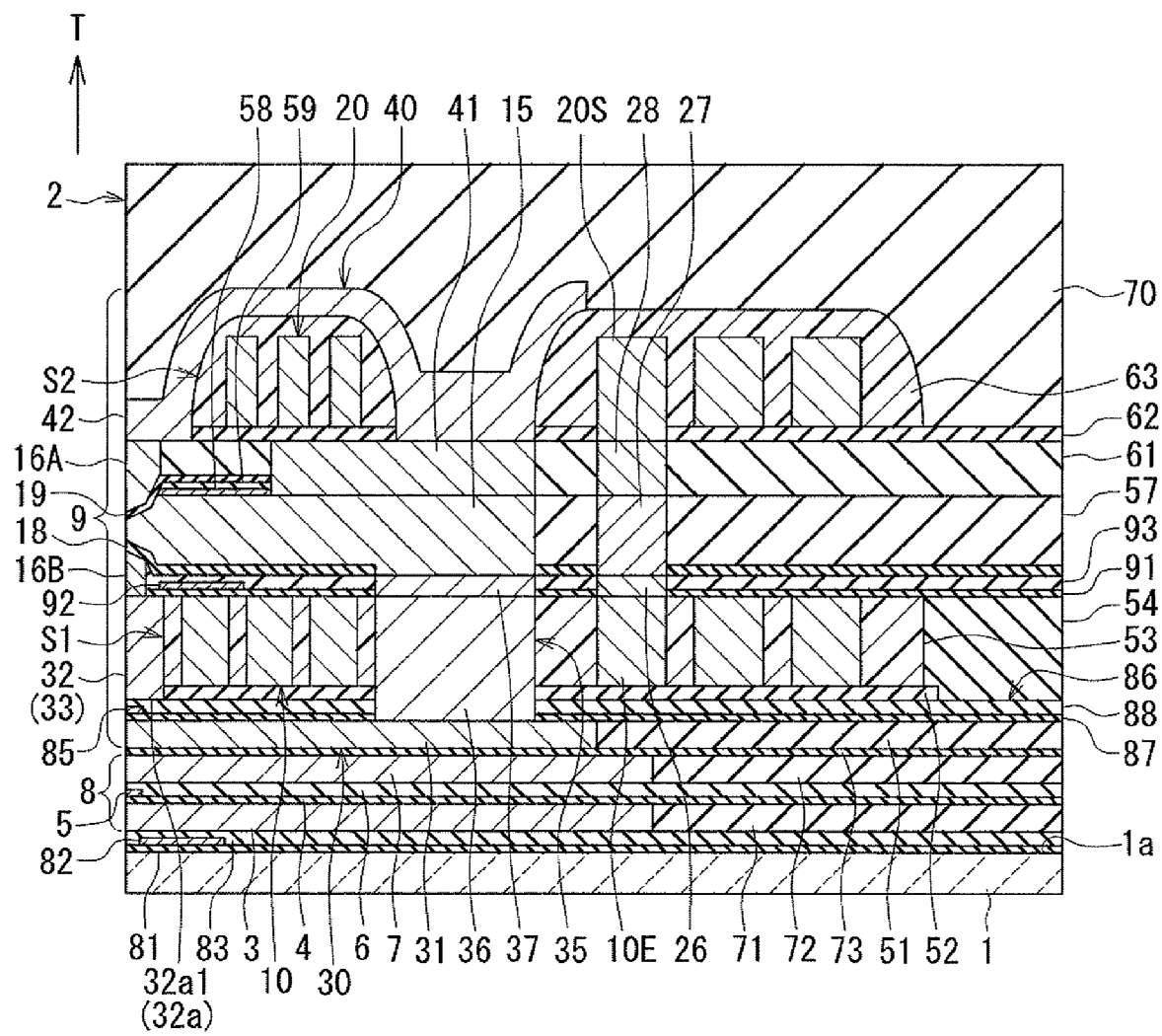
FIG. 1 is a cross-sectional view of a magnetic head according to a first embodiment of the invention.
Figure 2:
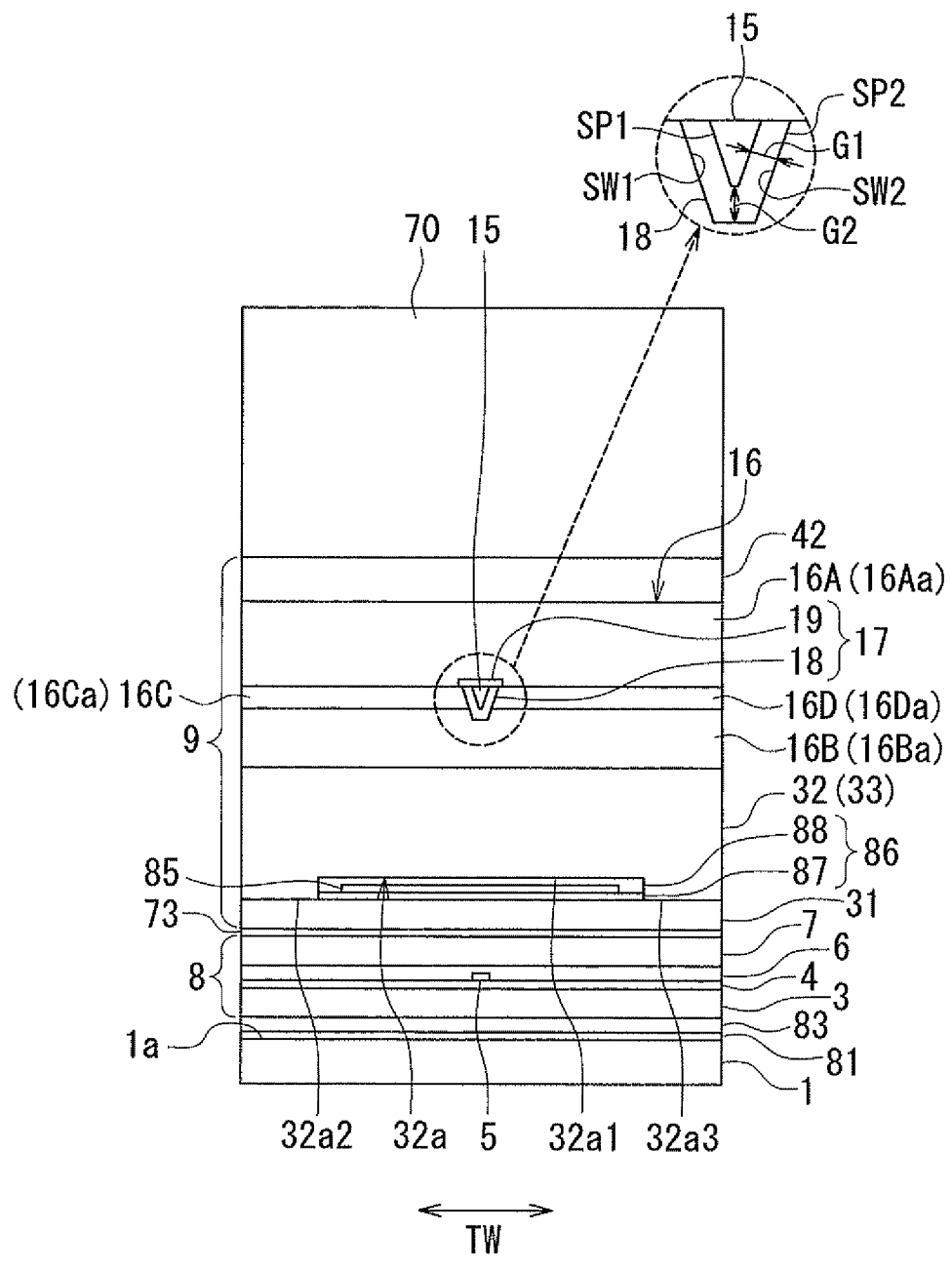
FIG. 2 is a front view showing the medium facing surface of the magnetic head according to the first embodiment of the invention.
Figure 3:
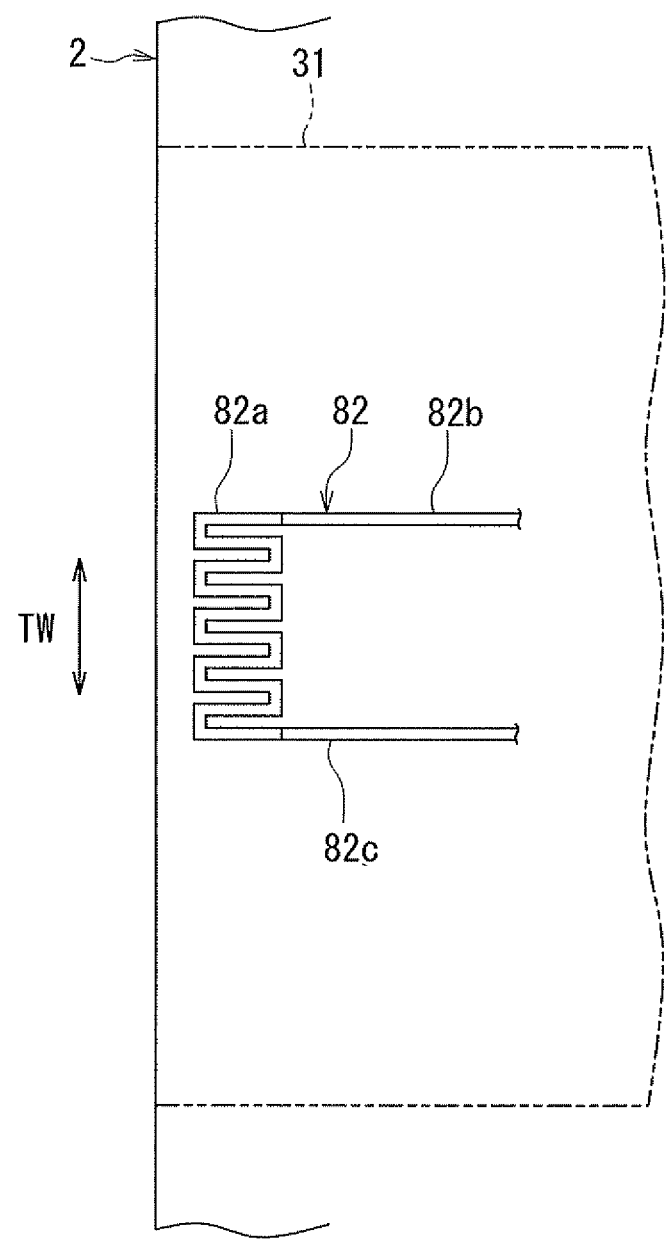
FIG. 3 is a plan view showing a first heater of the magnetic head according to the first embodiment of the invention.
Figure 4:
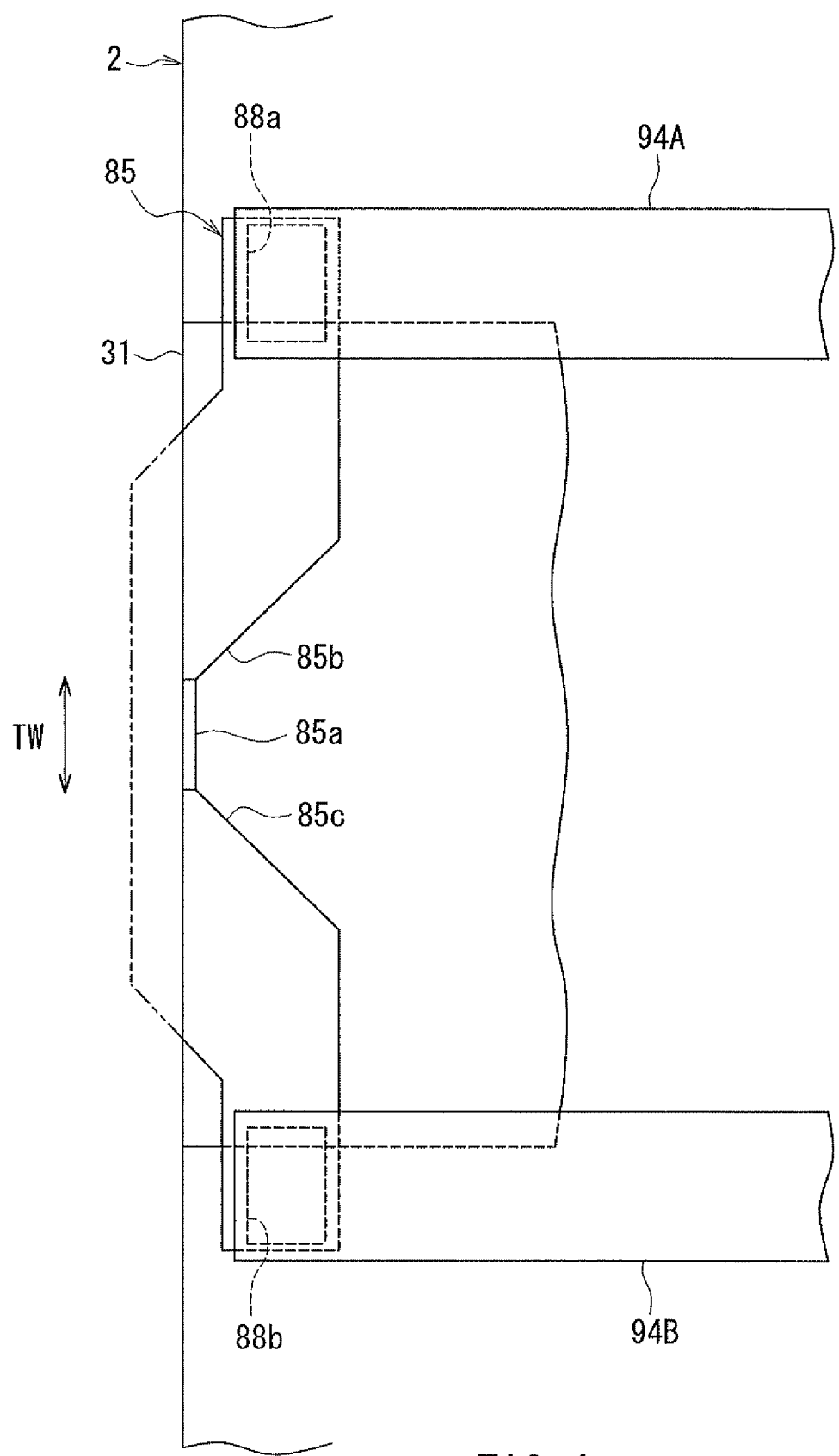
FIG. 4 is a plan view showing a sensor of the magnetic head according to the first embodiment of the invention.
Figure 5:
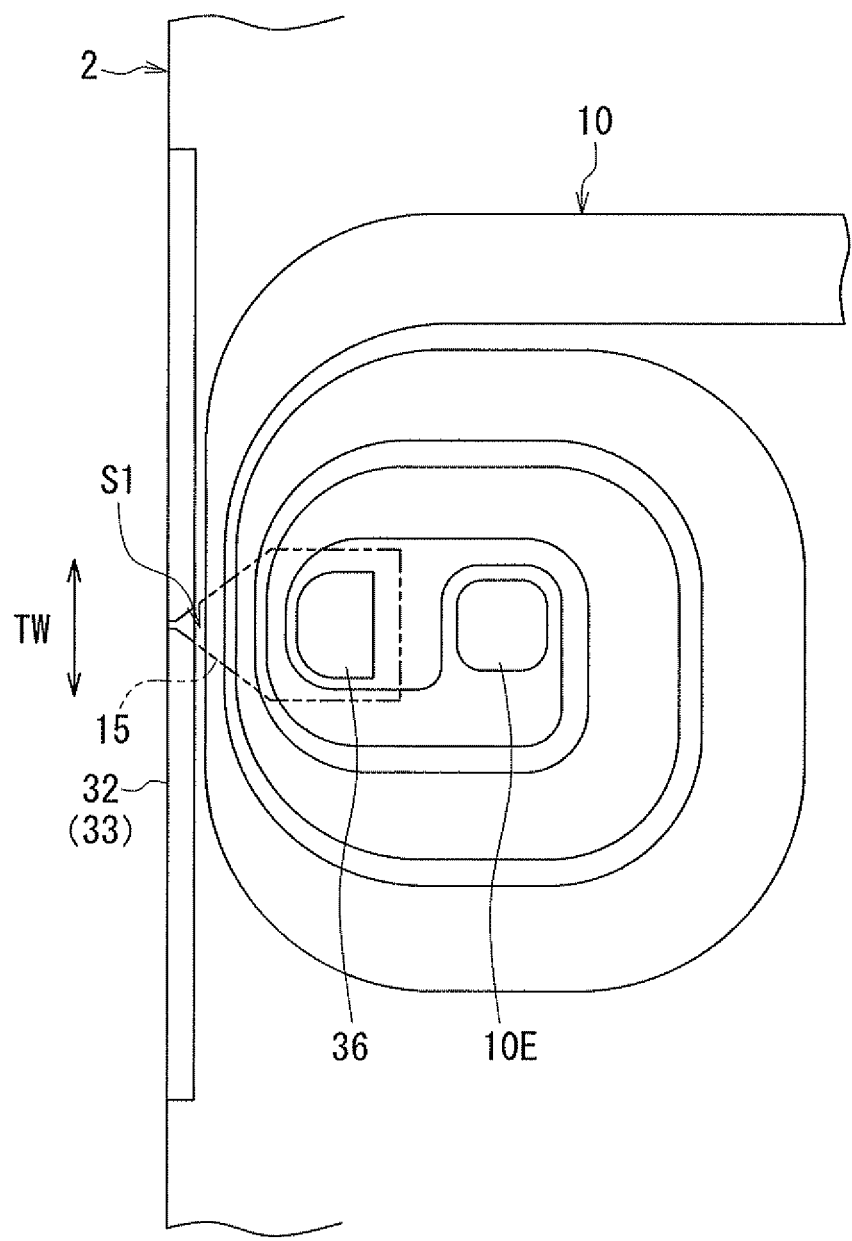
FIG. 5 is a plan view showing a first portion of a coil of the magnetic head according to the first embodiment of the invention.

Embodiments of the present invention will now be described in detail with reference to the drawings. First, reference is made to FIG. 1 to FIG. 5 to describe the configuration of a magnetic head according to a first embodiment of the invention. FIG. 1 is a cross-sectional view of the magnetic head according to the present embodiment. Note that FIG. 1 shows a cross section perpendicular to the medium facing surface and the top surface of the substrate. The arrow with the symbol T in FIG. 1 indicates the direction of travel of the recording medium. FIG. 2 is a front view showing the medium facing surface of the magnetic head according to the present embodiment. FIG. 3 is a plan view showing a first heater of the magnetic head according to the present embodiment. FIG. 4 is a plan view showing a sensor of the magnetic head according to the present embodiment. FIG. 5 is a plan view showing a first portion of a coil of the magnetic head according to the present embodiment. The arrows with the symbol TW in FIG. 2 to FIG. 5 indicate the track width direction.

As shown in FIG. 1 and FIG. 2, the magnetic head for perpendicular magnetic recording (hereinafter simply referred to as magnetic head) according to the present embodiment includes: a substrate 1 made of a ceramic material such as aluminum oxide-titanium carbide ($Al_2O_3$—TiC) and having a top surface 1a; an insulating layer 81 made of an insulating material and disposed on the top surface 1a of the substrate 1; a first heater 82 disposed on the insulating layer 81; and an insulating layer 83 made of an insulating material and disposed to cover the insulating layer 81 and the first heater 82. The insulating layers 81 and 83 are made of alumina ($Al_2O_3$), for example. The first heater 82 will be described in detail later.

The magnetic head further includes a read head unit 8 disposed forward along the direction T of travel of the recording medium (i.e., on the trailing end side) relative to the first heater 82. The read head unit 8 includes: a first read shield layer 3 made of a magnetic material and disposed on the insulating layer 83; an insulating layer 71 made of an insulating material and disposed on the insulating layer 83 around the first read shield layer 3; a first read shield gap film 4 which is an insulating film disposed to cover the first read shield layer 3 and the insulating layer 71; a magnetoresistive (MR) element 5 as a read element disposed on the first read shield gap film 4; a second read shield gap film 6 which is an insulating film disposed on the MR element 5; a second read shield layer 7 made of a magnetic material and disposed on the second read shield gap film 6; and an insulating layer 72 made of an insulating material and disposed on the second read shield gap film 6 around the second read shield layer 7.

An end of the MR element 5 is located in a medium facing surface 2 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of layers constituting the GMR element.

The magnetic head further includes a nonmagnetic layer 73 made of a nonmagnetic material and disposed on the second read shield layer 7, and a write head unit 9 disposed on the nonmagnetic layer 73. The nonmagnetic layer 73 is made of alumina, for example. The write head unit 9 includes a coil, a main pole 15, a write shield 16, and a gap part 17.

The coil includes a first portion 10 and a second portion 20. The first portion 10 and the second portion 20 are both made of a conductive material such as copper. As shown in FIG. 5, the first portion 10 is planar spiral-shaped. The second portion 20 is planar spiral-shaped like the first portion 10. The first portion 10 and the second portion 20 are connected in series or in parallel. In FIG. 1 and FIG. 5, the reference symbol 10E indicates a coil connection part of the first portion 10 connected to the second portion 20. In FIG. 1, the reference symbol 20S indicates a coil connection part of the second portion 20 connected to the coil connection part 10E of the first portion 10.

The magnetic head further includes connection layers 26, 27, and 28 that are each made of a conductive material and are stacked in this order on the coil connection part 10E. The coil connection part 20S is disposed on the connection layer 28.

The coil including the first and second portions 10 and 20 produces a magnetic field corresponding to data to be written on the recording medium. The main pole 15 has an end face located in the medium facing surface 2. The main pole 15 allows a magnetic flux corresponding to the magnetic field produced by the coil to pass, and produces a write magnetic field for writing data on the recording medium by means of the perpendicular magnetic recording system. FIG. 1 shows a cross section that intersects the end face of the main pole 15 located in the medium facing surface 2 and that is perpendicular to the medium facing surface 2 and the top surface 1a of the substrate 1 (the cross section will hereinafter be referred to as main cross section).

The write shield 16 has an end face located in the medium facing surface 2. The end face of the write shield 16 includes first to fourth end face portions 16Aa, 16Ba, 16Ca, and 16Da. The first end face portion 16Aa is located forward of the end face of the main pole 15 along the direction T of travel of the recording medium. The second end face portion 16Ba is located backward of the end face of the main pole 15 along the direction T of travel of the recording medium. The third and fourth end face portions 16Ca and 16Da are located on opposite sides of the end face of the main pole 15 in the track width direction TW. In the medium facing surface 2, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head unit 9 further includes a first return path section 30 and a second return path section 40. The first and second return path sections 30 and 40 are both made of a magnetic material. Examples of materials that can be used for the first and second return path sections 30 and 40 include CoFeN, CoNiFe, NiFe, and CoFe. The first return path section 30 is disposed backward of the main pole 15 along the direction T of travel of the recording medium and contacts the write shield 16 and the main pole 15, thereby magnetically coupling the write shield 16 and the main pole 15 to each other. The second return path section 40 is disposed forward of the main pole 15 along the direction T of travel of the recording medium and contacts the write shield 16 and the main pole 15, thereby magnetically coupling the write shield 16 and the main pole 15 to each other.

The first return path section 30 includes: a yoke layer 31 disposed backward of the main pole 15 along the direction T of travel of the recording medium; a first coupling part 32 that couples the yoke layer 31 and the write shield 16 to each other; and a second coupling part 35 that is located away from the medium facing surface 2 and couples the yoke layer 31 and the main pole 15 to each other.

The yoke layer 31 is disposed on the nonmagnetic layer 73. The yoke layer 31 has an end face located in the medium facing surface 2. The magnetic head further includes an insulating layer 51 that is made of an insulating material and disposed on the nonmagnetic layer 73 to surround the yoke layer 31, and a sensor 85 and a nonmagnetic part 86 that are disposed forward of the yoke layer 31 along the direction T of travel of the recording medium. The insulating layer 51 is made of alumina, for example. The nonmagnetic part 86 is made of a nonmagnetic material. The material of the nonmagnetic part 86 may be alumina, for example.

The nonmagnetic part 86 includes nonmagnetic layers 87 and 88. The nonmagnetic layer 87 is disposed on part of the top surface of the yoke layer 31 and the top surface of the insulating layer 51. The sensor 85 is disposed on the nonmagnetic layer 87. The nonmagnetic layer 88 is disposed to cover the sensor 85. As shown in FIG. 4, the nonmagnetic layer 88 has an opening 88a for exposing part of the top surface of the sensor 85 and an opening 88b for exposing another part of the top surface of the sensor 85. The magnetic head further includes lead layers 94A and 94B that are disposed on the nonmagnetic layer 88 and extend perpendicularly to the medium facing surface 2. The lead layer 94A is electrically connected to the sensor 85 through the opening 88a. The lead layer 94B is electrically connected to the sensor 85 through the opening 88b. The lead layers 94A and 94B are made of a conductive material such as copper.

As shown in FIG. 2, the first coupling part 32 has an end face 32a facing toward the yoke layer 31. The end face 32a includes a middle portion 32a1 that is spaced from the yoke layer 31 and faces the yoke layer 31, and two side portions 32a2 and 32a3 that are located on opposite sides of the middle portion 32a1 in the track width direction TW and in contact with the yoke layer 31. The sensor 85 is located between the middle portion 32a1 and the yoke layer 31. The sensor 85 will be described in detail later.

The first coupling part 32 includes a magnetic layer 33. The second coupling part 35 includes magnetic layers 36 and 37. The magnetic layer 33 has a first end face located in the medium facing surface 2, and a second end face facing toward the yoke layer 31. The second end face of the magnetic layer 33 is also the end face 32a of the first coupling part 32. The magnetic layer 36 is located on the yoke layer 31 at a position farther from the medium facing surface 2 than the magnetic layer 33.

The magnetic head further includes an insulating layer 52 made of an insulating material and disposed on part of the top surface of the nonmagnetic layer 88. The insulating layer 52 is made of alumina, for example. At least part of the first portion 10 is located on the insulating layer 52. The first portion 10 is wound around the magnetic layer 36 which constitutes part of the first return path section 30.

The magnetic head further includes: an insulating layer 53 made of an insulating material and disposed around the first portion 10 and the magnetic layer 36 and in the space between every adjacent turns of the first portion 10; and an insulating layer 54 made of an insulating material and disposed around the insulating layer 53 and the magnetic layer 33. The top surfaces of the first portion 10, the magnetic layers 33 and 36 and the insulating layers 53 and 54 are even with each other. The insulating layer 53 is made of photoresist, for example. The insulating layer 54 is made of alumina, for example.

The write shield 16 includes a first shield 16A, a second shield 16B, and two side shields 16C and 16D. The two side shields 16C and 16D are located on opposite sides of the main pole 15 in the track width direction TW. The first shield 16A is located forward of the main pole 15 along the direction T of travel of the recording medium. The second shield 16B is located backward of the main pole 15 along the direction T of travel of the recording medium. The side shields 16C and 16D magnetically couple the first shield 16A and the second shield 16B to each other.

The first shield 16A has the first end face portion 16Aa. The second shield 16B has the second end face portion 16Ba. The side shield 16C has the third end face portion 16Ca. The side shield 16D has the fourth end face portion 16Da.

The second shield 16B is disposed on the magnetic layer 33. The magnetic layer 37 is disposed on the magnetic layer 36. The connection layer 26 is disposed on the coil connection part 10E of the first portion 10. The magnetic head further includes insulating layers 91 and 93 each made of an insulating material, and a second heater 92. The insulating layer 91 is disposed on part of the top surface of the magnetic layer 33 and the top surfaces of the first portion 10 and the insulating layers 53 and 54 around the second shield 16B, the magnetic layer 37 and the connection layer 26. The second heater 92 is disposed on the insulating layer 91. The insulating layer 93 is disposed to cover the insulating layer 91 and the second heater 92. The insulating layers 91 and 93 are made of alumina, for example. The second heater 92 will be described in detail later.

The main pole 15 has: a bottom end 15L which is an end closer to the top surface 1a of the substrate 1; a top surface 15T opposite to the bottom end 15L; and first and second side parts SP1 and SP2 that are opposite to each other in the track width direction TW. The side shield 16C has a first sidewall SW1 that is opposed to the first side part SP1 of the main pole 15. The side shield 16D has a second sidewall SW2 that is opposed to the second side part SP2 of the main pole 15.

The gap part 17 is made of a nonmagnetic material and disposed between the main pole 15 and the write shield 16. The gap part 17 includes a first gap layer 18 disposed between the main pole 15 and the second shield 16B and between the main pole 15 and the side shields 16C and 16D, and a second gap layer 19 disposed between the main pole 15 and the first shield 16A.

The side shields 16C and 16D are disposed on the second shield 16B and in contact with the top surface of the second shield 16B. The first gap layer 18 is arranged to extend along the sidewalls of the side shields 16C and 16D, the top surface of the second shield 16B, and the top surface of the insulating layer 93. The first gap layer 18 is made of a nonmagnetic material. The nonmagnetic material used to form the first gap layer 18 may be an insulating material or a nonmagnetic metal material. Alumina is an example of insulating materials that can be used to form the first gap layer 18. Ru is an example of nonmagnetic metal materials that can be used to form the first gap layer 27. The first gap layer 18 has an opening for exposing the top surface of the connection layer 26 and an opening for exposing the top surface of the magnetic layer 37. The connection layer 27 is disposed on the connection layer 26.

The main pole 15 is disposed over the second shield 16B and the insulating layer 93 such that the first gap layer 18 is interposed between the main pole 15 and the top surfaces of the second shield 16B and the insulating layer 93. As shown in FIG. 2, the first gap layer 18 is interposed also between the main pole 15 and each of the side shields 16C and 16D.

The bottom end 15L of the main pole 15 is in contact with the top surface of the magnetic layer 37 at a position away from the medium facing surface 2. The main pole 15 is made of a magnetic metal material. Examples of materials that can be used for the main pole 15 include NiFe, CoNiFe, and CoFe. The shape of the main pole 15 will be described in detail later.

The magnetic head further includes a nonmagnetic layer 57 made of a nonmagnetic material and disposed around the main pole 15, the second shield 16B, the side shields 16C and 16D, and the connection layer 27. In the present embodiment, the nonmagnetic layer 57 is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 2; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The second gap layer 19 is disposed to cover the main pole 15, the nonmagnetic metal layer 58, and the insulating layer 59. The second gap layer 19 is made of a nonmagnetic material. Examples of materials that can be used for the second gap layer 19 include nonmagnetic insulating materials such as alumina, and nonmagnetic conductive materials such as Ru, NiCu, Ta, W, NiB, and NiP.

The first shield 16A is disposed over the side shields 16C and 16D and the second gap layer 19, and is in contact with the top surfaces of the side shields 16C and 16D and the second gap layer 19. In the medium facing surface 2, part of the end face of the first shield 16A is located at a predetermined distance from the end face of the main pole 15, the distance being created by the thickness of the second gap layer 19. The thickness of the second gap layer 19 preferably falls within the range of 5 to 60 nm, and may be 30 to 60 nm, for example. The end face of the main pole 15 has a side that is adjacent to the second gap layer 19, and the side defines the track width.

The second return path section 40 includes a yoke layer 41 and a magnetic layer 42. The yoke layer 41 is disposed on the main pole 15 at a position away from the medium facing surface 2. The connection layer 28 is disposed on the connection layer 27. The magnetic head further includes a nonmagnetic layer 61 disposed around the first shield 16A, the yoke layer 41 and the connection layer 28. The nonmagnetic layer 61 is made of an inorganic insulating material, for example. The inorganic insulating material may be alumina or silicon oxide, for example. The top surfaces of the first shield 16A, the yoke layer 41, the connection layer 28 and the nonmagnetic layer 61 are even with each other.

The magnetic head further includes insulating layers 62 and 63 each made of an insulating material. The insulating layer 62 is disposed on part of the top surfaces of the yoke layer 41 and the nonmagnetic layer 61. At least part of the second portion 20 is located on the insulating layer 62. The coil connection part 20S of the second portion 20 is located on the connection layer 28. The insulating layer 63 is arranged to cover the second portion 20. The insulating layer 62 is made of alumina, for example. The insulating layer 63 is made of photoresist, for example.

The magnetic layer 42 is disposed over the first shield 16A, the yoke layer 41 and the insulating layer 63, and connects the first shield 16A and the yoke layer 41 to each other. The magnetic layer 42 has an end face located in the medium facing surface 2. The second portion 20 is wound around part of the magnetic layer 42 located on the yoke layer 41, the magnetic layer 42 constituting part of the second return path section 40.

The magnetic head further includes a protection layer 70 made of a nonmagnetic material and disposed to cover the magnetic layer 42 and the insulating layers 62 and 63. The protection layer 70 is made of, for example, an inorganic insulating material such as alumina.

As has been described, the magnetic head according to the present embodiment includes the medium facing surface 2, the read head unit 8, and the write head unit 9. The medium facing surface 2 faces the recording medium. The read head unit 8 and the write head unit 9 are stacked on the substrate 1. Relative to the write head unit 9, the read head unit 8 is disposed backward along the direction T of travel of the recording medium (i.e., on the leading end side).

The read head unit 8 includes: the MR element 5 as the read element; the first read shield layer 3 and the second read shield layer 7 for shielding the MR element 5, with their respective portions near the medium facing surface 2 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head unit 9 includes: the coil including the first portion 10 and the second portion 20; the main pole 15; the write shield 16; the gap part 17; and the first and second return path sections 30 and 40.

The write shield 16 includes the first shield 16A, the two side shields 16C and 16D, and the second shield 16B. The gap part 17 includes the first gap layer 18 and the second gap layer 19.

The first return path section 30 includes the yoke layer 31 and the first and second coupling parts 32 and 35. The yoke layer 31 is disposed backward of the main pole 15 along the direction T of travel of the recording medium. The first coupling part 32 has the end face 32a facing toward the yoke layer 31. The end face 32a includes the middle portion 32a1 spaced from the yoke layer 31 and facing the yoke layer 31, and the two side portions 32a2 and 32a3 located on opposite sides of the middle portion 32a1 in the track width direction TW and in contact with the yoke layer 31. The first coupling part 32 includes the magnetic layer 33. The second coupling part 35 includes the magnetic layers 36 and 37.

As shown in FIG. 1, the first return path section 30 connects the write shield 16 and the main pole 15 to each other so that a first space S1 is defined by the main pole 15, the gap part 17 (the gap layer 18), the write shield 16 and the first return path section 30, thereby magnetically coupling the write shield 16 and the main pole 15 to each other. The first portion 10 of the coil passes through the first space S1.

In the first return path section 30, the first coupling part 32 (the magnetic layer 33) magnetically couples the second shield 16B and the yoke layer 31 to each other. The magnetic layer 33 has an end face (first end face) that is located in the medium facing surface 2 at a position backward of the end face of the second shield 16B along the direction T of travel of the recording medium. In the main cross section, the yoke layer 31 is greater than the second shield 16B in length in the direction perpendicular to the medium facing surface 2. In the main cross section, the magnetic layer 33 is greater than the second shield 16B and smaller than the yoke layer 31 in length in the direction perpendicular to the medium facing surface 2.

The second return path section 40 is disposed forward of the main pole 15 along the direction T of travel of the recording medium. The second return path section 40 includes the yoke layer 41 and the magnetic layer 42. As shown in FIG. 1, the second return path section 40 connects the write shield 16 and the main pole 15 to each other so that a second space S2 is defined by the main pole 15, the gap part 17 (the gap layer 19), the write shield 16 and the second return path section 40, thereby magnetically coupling the write shield 16 and the main pole 15 to each other. The second portion 20 of the coil passes through the second space S2.

The magnetic head according to the present embodiment further includes the first and second heaters 82 and 92, and the sensor 85. The sensor 85 is disposed between the yoke layer 31 and the middle portion 32a1 of the end face 32a of the first coupling part 32. Relative to the sensor 85, the first heater 82 is located backward along the direction T of travel of the recording medium (i.e., on the leading end side). Relative to the sensor 85, the second heater 92 is located forward along the direction T of travel of the recording medium (i.e., on the trailing end side).

The first heater 82, the second heater 92, and the sensor 85 will be described in detail below. First, reference is made to FIG. 3 to describe the first and second heaters 82 and 92. The first and second heaters 82 and 92 are intended to make the medium facing surface 2 protrude in part so as to reduce the distance from the read head unit 8 and the write head unit 9 to the surface of the recording medium. As will be described later, the first and second heaters 82 and 92 generate heat for making the medium facing surface 2 protrude in part.

As shown in FIG. 3, the first heater 82 includes a heat generating layer 82a located near the medium facing surface 2 and extending in the track width direction TW, and two lead layers 82b and 82c electrically connected to opposite ends of the heat generating layer 82a in the track width direction TW. In the example shown in FIG. 3, the heat generating layer 82a is meandering in shape. One of two ends of the heat generating layer 82a closer to the medium facing surface 2 is located at a distance from the medium facing surface 2. The heat generating layer 82a is made of a conductive material, such as metal, which generates heat by being energized. For example, the heat generating layer 82a is formed of a film of NiCr or a layered film consisting of Ta, NiCu, and Ta films. The lead layers 82b and 82c are each made of a conductive material such as copper. The second heater 92 has the same configuration as that of the first heater 82.

Figure 6:
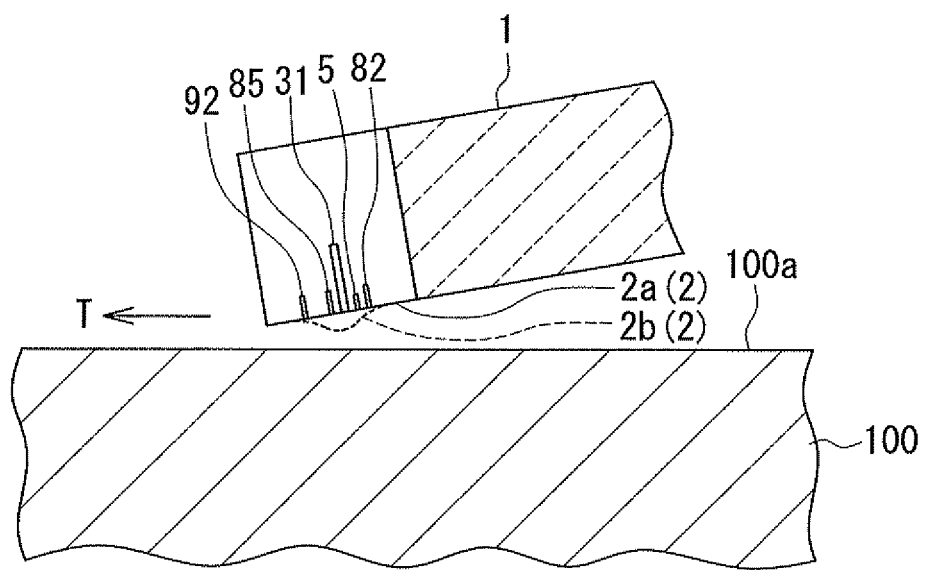
FIG. 6 is an explanatory diagram illustrating the operation of making part of the medium facing surface protrude in the magnetic head according to the first embodiment of the invention.

Next, referring to FIG. 6, a description will be given of a method for reducing the distance from the read head unit 8 and the write head unit 9 to the surface of the recording medium by using the first and second heaters 82 and 92. FIG. 6 is an explanatory diagram illustrating the operation of making part of the medium facing surface 2 protrude in the magnetic head according to the present embodiment. An electric current is passed through the heat generating layer 82a of the first heater 82 via the two lead layers 82b and 82c. Similarly, an electric current is passed through the heat generating layer of the second heater 92 via the two lead layers of the second heater 92. Consequently, the heaters 82 and 92 generate heat for making the medium facing surface 2 protrude in part.

The components of the magnetic head expand with the heat generated by the heaters 82 and 92. In particular, the layers made of magnetic materials, including the yoke layer 31, have high thermal conductivities and linear thermal expansion coefficients. Such layers therefore greatly expand with the heat generated by the heaters 82 and 92, thereby making the medium facing surface 2 protrude in part. This reduces the distance from the read head unit 8 and the write head unit 9 to the surface 100a of the recording medium 100.

In FIG. 6, the reference symbol 2a indicates the position of the medium facing surface 2 when the heaters 82 and 92 generate no heat, while the reference symbol 2b indicates the position of the medium facing surface 2 that is protruded in part by the heat generation of the heaters 82 and 92. The amount of protrusion of the part of the medium facing surface 2 with reference to the position indicated by the reference symbol 2a can be controlled by adjusting the magnitudes of the currents passed through the heaters 82 and 92. The protruding shape of the medium facing surface 2 can be controlled somewhat by adjusting the respective magnitudes of the currents passed through the heaters 82 and 92 independently.

Next, the sensor 85 will be described with reference to FIG. 4. The sensor 85 is intended to detect contact of part of the medium facing surface 2 with the recording medium 100. The sensor 85 of the present embodiment includes a detection part 85a of oblong shape that extends in the track width direction TW, and connection parts 85b and 85c connected to opposite ends of the detection part 85a in the track width direction TW. In the present embodiment, the detection part 85a and the connection parts 85b and 85c are exposed in the medium facing surface 2. The shape of the sensor 85 is determined in the manufacturing process of the magnetic head, when forming the medium facing surface 2 by polishing. More specifically, in the manufacturing process of the magnetic head, a preliminary sensor layer including a part to be the sensor 85 is formed. The preliminary sensor layer is polished when forming the medium facing surface 2, and its remaining part makes the sensor 85. In FIG. 4, the part of the preliminary sensor layer removed by polishing during the formation of the medium facing surface 2 is shown by the chain double-dashed lines.

The length of the detection part 85a in the direction perpendicular to the medium facing surface 2 is constant regardless of position along the track width direction TW. The maximum length of each of the connection parts 85b and 85c in the direction perpendicular to the medium facing surface 2 is greater than the length of the detection part 85a in that direction. The lead layer 94A is electrically connected to the connection part 85b through the opening 88a. The lead layer 94B is electrically connected to the connection part 85c through the opening 88b.

The sensor 85 is a resistor that varies in resistance with a change in its own temperature when part of the medium facing surface 2 makes contact with the recording medium 100. The sensor 85 is made of a metal material or a semiconductor material that varies in resistance at a considerable rate with respect to a change in temperature, i.e., that has a considerable temperature coefficient of resistance. Specific examples of the material of the sensor 85 include NiFe, W, Cu, Ni, and Pt.

When part of the medium facing surface 2 comes into contact with the recording medium 100, the frictional heat resulting from the contact raises the temperature of the medium facing surface 2 at and in the vicinity of the part in contact with the recording medium 100. Such a rise in temperature also raises the temperature of the sensor 85 itself. As a result, the sensor 85 varies in resistance. The resistance of the sensor 85 can thus be measured through the lead layers 94A and 94B to detect the contact of part of the medium facing surface 2 with the recording medium 100.

In the example shown in FIG. 4, the cross section of the detection part 85a orthogonal to the track width direction TW has an area extremely smaller than that of the cross section of each of the connection parts 85b and 85c. The resistance of the sensor 85 is thus mostly attributable to that of the detection part 85a. Most of a change in the resistance of the sensor 85 is also attributable to that of the detection part 85a.

Figure 7:
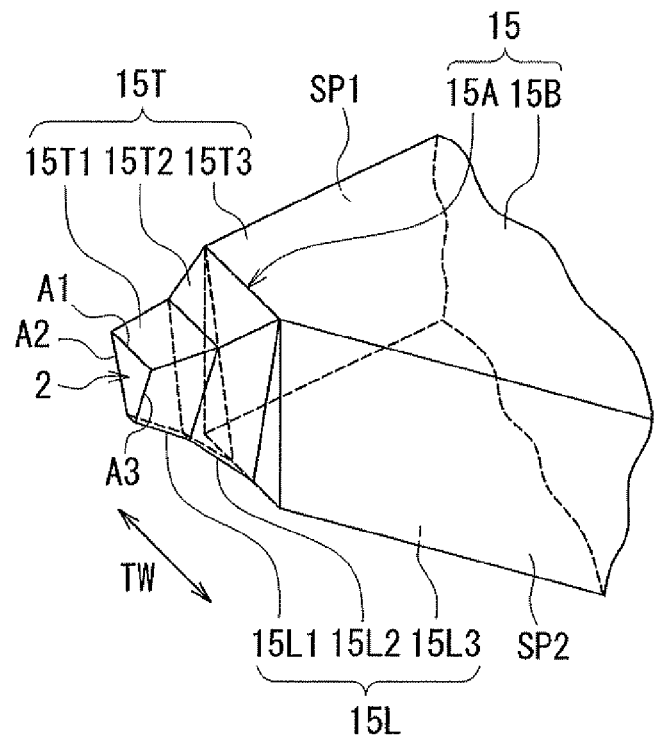
FIG. 7 is a perspective view showing part of a main pole near the medium facing surface in the magnetic head according to the first embodiment of the invention.
Figure 8:
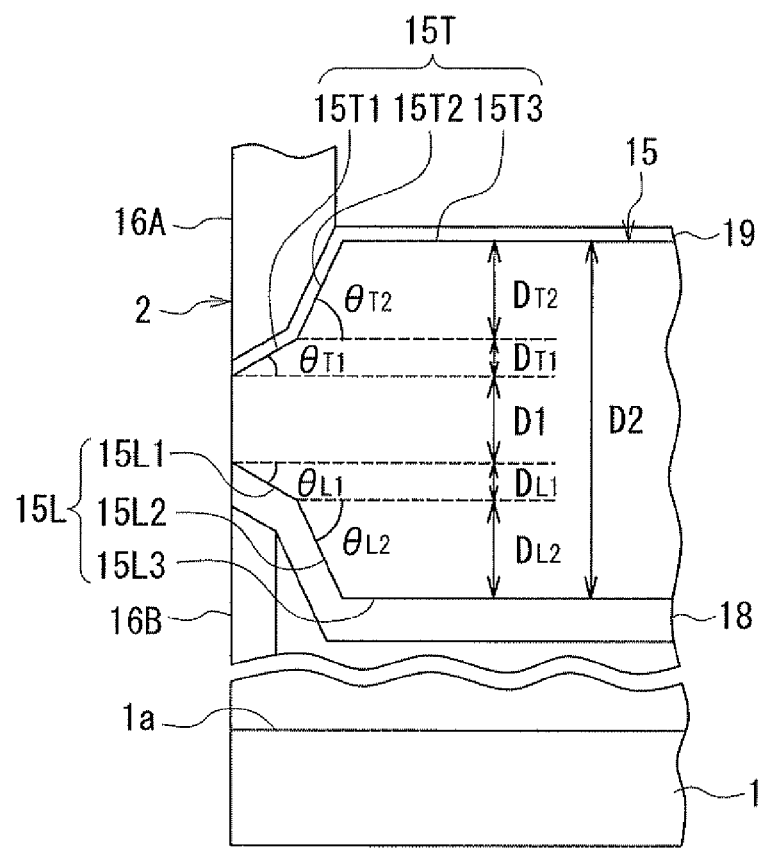
FIG. 8 is a cross-sectional view showing part of the main pole near the medium facing surface in the magnetic head according to the first embodiment of the invention.

The shape of the main pole 15 will now be described in detail with reference to FIG. 7 and FIG. 8. FIG. 7 is a perspective view of part of the main pole 15 in the vicinity of the medium facing surface 2. FIG. 8 is a cross-sectional view of part of the main pole 15 in the vicinity of the medium facing surface 2. As shown in FIG. 7, the main pole 15 includes a track width defining portion 15A and a wide portion 15B. The track width defining portion 15A has an end face located in the medium facing surface 2, and an end opposite to the end face. The wide portion 15B is connected to the end of the track width defining portion 15A. As shown in FIG. 7 and FIG. 8, the main pole 15 has: the bottom end 15L which is the end closer to the top surface 1a of the substrate 1; the top surface 15T opposite to the bottom end 15L; the first side part SP1; and the second side part SP2. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 2. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 2, then becoming constant. Here, the length of the track width defining portion 15A in the direction perpendicular to the medium facing surface 2 will be referred to as neck height. The neck height falls within the range of 0 to 0.3 µm, for example. A zero neck height means that no track width defining portion 15A exists and an end face of the wide portion 15B is thus located in the medium facing surface 2.

The bottom end 15L includes a first portion 15L1, a second portion 15L2, and a third portion 15L3 that are contiguously arranged in order of increasing distance from the medium facing surface 2. The first portion 15L1 has an end located in the medium facing surface 2. Each of the first and second portions 15L1 and 15L2 may be an edge formed by two intersecting planes, or may be a plane connecting two planes to each other. The third portion 15L3 is a plane extending in a direction substantially perpendicular to the medium facing surface 2. The top surface 15T includes a fourth portion 15T1, a fifth portion 15T2, and a sixth portion 15T3 that are contiguously arranged in order of increasing distance from the medium facing surface 2. The fourth portion 15T1 has an end located in the medium facing surface 2.

As shown in FIG. 8, the distance from the top surface 1a of the substrate 1 to any given point on each of the first and second portions 15L1 and 15L2 decreases with increasing distance from the given point to the medium facing surface 2. The first portion 15L1 has an angle of inclination $\theta_{L1}$ with respect to the direction perpendicular to the medium facing surface 2, and the second portion 15L2 has an angle of inclination $\theta_{L2}$ with respect to the direction perpendicular to the medium facing surface 2, $\theta_{L2}$ being greater than $\theta_{L1}$. The second shield 16B has a top surface that is opposed to the first portion 15L1 with the gap part 17 (the first gap layer 18) interposed therebetween. The distance from the top surface 1a of the substrate 1 to any given point on the top surface of the second shield 16B decreases with increasing distance from the given point to the medium facing surface 2.

The distance from the top surface 1a of the substrate 1 to any given point on each of the fourth and fifth portions 15T1 and 15T2 increases with increasing distance from the given point to the medium facing surface 2. The fourth portion 15T1 has an angle of inclination $\theta_{T1}$ with respect to the direction perpendicular to the medium facing surface 2, and the fifth portion 15T2 has an angle of inclination $\theta_{T2}$ with respect to the direction perpendicular to the medium facing surface 2, $\theta_{T2}$ being greater than $\theta_{T1}$. The sixth portion 15T3 extends in the direction substantially perpendicular to the medium facing surface 2. The first shield 16A has a bottom surface that is opposed to the fourth and fifth portions 15T1 and 15T2 with the gap part 17 (the second gap layer 19) interposed therebetween. The distance from the top surface 1a of the substrate 1 to any given point on the bottom surface of the first shield 16A increases with increasing distance from the given point to the medium facing surface 2.

Both the angle of inclination $\theta_{L1}$ of the first portion 15L1 and the angle of inclination $\theta_{T1}$ of the fourth portion 15T1 preferably fall within the range of 15° to 45°. Both the angle of inclination $\theta_{L2}$ of the second portion 15L2 and the angle of inclination $\theta_{T2}$ of the fifth portion 15T2 preferably fall within the range of 45° to 85°.

As shown in FIG. 7, the end face of the main pole 15 located in the medium facing surface 2 has a first side A1 adjacent to the second gap layer 19, a second side A2 connected to a first end of the first side A1, and a third side A3 connected to a second end of the first side A1. The first side A1 defines the track width. The position of an end of a record bit to be recorded on the recording medium 100 depends on the position of the first side A1. The end face of the main pole 15 located in the medium facing surface 2 decreases in width in the track width direction TW with increasing proximity to the bottom end 15L of the main pole 15, that is, with increasing proximity to the top surface 1a of the substrate 1. Each of the second side A2 and the third side A3 is at an angle in the range of, for example, 7° to 17°, or preferably in the range of 10° to 15°, with respect to the direction perpendicular to the top surface of the substrate 1. The first side A1 has a length in the range of 0.05 to 0.20 µm, for example.

Here, as shown in FIG. 8, let D1 be the thickness (length in the direction perpendicular to the top surface 1a of the substrate 1) of the main pole 15 at the medium facing surface 2, and D2 be the distance between the third portion 15L3 and the sixth portion 15T3. Let also $D_{L1}$ be the length in the direction perpendicular to the top surface 1a of the substrate 1 between two ends of the first portion 15L1 that are opposite to each other in that direction. Let also $D_{L2}$ be the length in the direction perpendicular to the top surface 1a of the substrate 1 between two ends of the second portion 15L2 that are opposite to each other in that direction. Let $D_{T1}$ be the length in the direction perpendicular to the top surface 1a of the substrate 1 between two ends of the fourth portion 15T1 that are opposite to each other in that direction. Let also $D_{T2}$ be the length in the direction perpendicular to the top surface 1a of the substrate 1 between two ends of the fifth portion 15T2 that are opposite to each other in that direction. For example, D1 falls within the range of 0.05 to 0.2 µm, while D2 falls within the range of 0.4 to 0.8 µm. For instance, $D_{L1}$ is greater than 0 and equal to or smaller than 0.3 µm, while $D_{L2}$ falls within the range of 0.15 to 0.3 µm. Furthermore, by way of example, $D_{T1}$ is greater than 0 and equal to or smaller than 0.3 µm, while $D_{T2}$ falls within the range of 0.15 to 0.3 µm.

FIG. 7 shows an example where the distance from the medium facing surface 2 to the boundary between the second portion 15L2 and the third portion 15L3, and the distance from the medium facing surface 2 to the boundary between the fifth portion 15T2 and the sixth portion 15T3, are both equal to the neck height, i.e., the distance from the medium facing surface 2 to the boundary between the track width defining portion 15A and the wide portion 15B. Nevertheless, the distance from the medium facing surface 2 to the boundary between the second portion 15L2 and the third portion 15L3, and the distance from the medium facing surface 2 to the boundary between the fifth portion 15T2 and the sixth portion 15T3, may each be smaller or greater than the neck height.

As shown in FIG. 2, in the medium facing surface 2, the distance between the first and second side parts SP1 and SP2 of the main pole 15 in the track width direction TW decreases with increasing proximity to the top surface 1a of the substrate 1. Likewise, in the medium facing surface 2, the distance between the first and second sidewalls SW1 and SW2 of the side shields 16C and 16D in the track width direction TW decreases with increasing proximity to the top surface 1a of the substrate 1. In the medium facing surface 2, the first side part SP1 and the first sidewall SW1 are substantially parallel to each other, and the second side part SP2 and the second sidewall SW2 are also substantially parallel to each other. In the medium facing surface 2, the distance between the first side part SP1 and the first sidewall SW1 and the distance between the second side part SP2 and the second sidewall SW2 are equal. These distances will hereinafter be denoted as G1. G1 falls within the range of 20 to 80 nm, for example. Here, let G2 be the distance between the bottom end 15L of the main pole 15 and the second shield 16B in the medium facing surface 2. G2 is greater than G1 and equal to or smaller than three times G1. This relationship is achieved by forming the first gap layer 18 and the main pole 15 after the formation of the side shields 16C and 16D having the sidewalls SW1 and SW2.

The function and effects of the magnetic head according to the present embodiment will now be described. The magnetic head writes data on the recording medium 100 with the write head unit 9 and reads data written on the recording medium 100 with the read head unit 8. In the write head unit 9, the coil including the first portion 10 and the second portion 20 produces magnetic fields corresponding to data to be written on the recording medium 100. A magnetic flux corresponding to the magnetic field produced by the first portion 10 passes through the first return path section 30 and the main pole 15. A magnetic flux corresponding to the magnetic field produced by the second portion 20 passes through the second return path section 40 and the main pole 15. Consequently, the main pole 15 allows the magnetic flux corresponding to the magnetic field produced by the first portion 10 and the magnetic flux corresponding to the magnetic field produced by the second portion 20 to pass.

The first portion 10 and the second portion 20 may be connected in series or in parallel. In either case, the first portion 10 and the second portion 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on the recording medium 100 by means of the perpendicular magnetic recording system.

The write shield 16 captures a disturbance magnetic field applied to the magnetic head from the outside thereof. This allows preventing erroneous writing on the recording medium 100 induced by the disturbance magnetic field intensively captured into the main pole 15. The write shield 16 also functions to capture a magnetic flux that is produced from the end face of the main pole 15 and that expands in directions other than the direction perpendicular to the plane of the recording medium 100, and to thereby prevent the magnetic flux from reaching the recording medium 100.

Furthermore, the write shield 16 and the first and second return path sections 30 and 40 function to allow a magnetic flux that has been produced from the end face of the main pole 15 and has magnetized the recording medium 100 to flow back. More specifically, a part of the magnetic flux that has been produced from the end face of the main pole 15 and has magnetized the recording medium 100 flows back to the main pole 15 through the write shield 16 and the first return path section 30. Another part of the magnetic flux that has been produced from the end face of the main pole 15 and has magnetized the recording medium 100 flows back to the main pole 15 through the write shield 16 and the second return path section 40.

The write shield 16 includes the first shield 16A, the second shield 16B, and the two side shields 16C and 16D. The present embodiment thus makes it possible that, in regions both backward and forward of the end face of the main pole 15 along the direction T of travel of the recording medium 100 and regions on opposite sides of the end face of the main pole 15 in the track width direction TW, a magnetic flux that is produced from the end face of the main pole 15 and expands in directions other than the direction perpendicular to the plane of the recording medium 100 can be captured and thereby prevented from reaching the recording medium 100. Consequently, the present embodiment allows preventing the skew-induced adjacent track erase. The first shield 16A and the second shield 16B contribute to an increase in the gradient of the write magnetic field, as well as the prevention of the skew-induced adjacent track erase. The side shields 16C and 16D greatly contribute to the prevention of adjacent track erase, in particular. According to the present embodiment, such functions of the write shield 16 serve to increase the recording density.

Furthermore, as shown in FIG. 2, the present embodiment is configured so that in the medium facing surface 2, the distance between the first and second side parts SP1 and SP2 of the main pole 15 in the track width direction TW, i.e., the width of the end face of the main pole 15, decreases with increasing proximity to the top surface 1a of the substrate 1. According to the present embodiment, this feature also serves to prevent the skew-induced adjacent track erase.

The present embodiment is also configured so that in the medium facing surface 2, the distance between the first and second sidewalls SW1 and SW2 of the side shields 16C and 16D in the track width direction TW decreases with increasing proximity to the top surface 1a of the substrate 1, as does the distance between the first and second side parts SP1 and SP2 of the main pole 15. The present embodiment thus makes it possible that the distance between the first side part SP1 and the first sidewall SW1 and the distance between the second side part SP2 and the second sidewall SW2 are both small and constant in the medium facing surface 2. This configuration allows the side shields 16C and 16D to effectively capture the magnetic flux that is produced from the end face of the main pole 15 and expands to opposite sides in the track width direction TW. As a result, the present embodiment can enhance the function of the side shields 16C and 16D in particular, and thereby prevent the skew-induced adjacent track erase more effectively.

The write shield 16 cannot capture much magnetic flux if the write shield 16 is not magnetically connected with any magnetic layer having a sufficiently large volume enough to accommodate the magnetic flux captured by the write shield 16. In the present embodiment, the write head unit 9 includes the first return path section 30 (the yoke layer 31, the first coupling part 32 and the second coupling part 35) which magnetically couples the write shield 16 and the main pole 15 to each other, and the second return path section 40 (the yoke layer 41 and the magnetic layer 42) which magnetically couples the write shield 16 and the main pole 15 to each other. Such a configuration allows the magnetic flux captured by the write shield 16 to flow into the main pole 15 by way of the first and second return path sections 30 and 40. In the present embodiment, the first and second return path sections 30 and 40 and the main pole 15, which are magnetic layers large in volume, are magnetically connected to the write shield 16. The present embodiment thus allows the write shield 16 to capture much magnetic flux, so that the above-described effect of the write shield 16 can be exerted effectively.

Furthermore, the present embodiment is provided with the second shield 16B in addition to the first return path section 30. In the main cross section, the yoke layer 31, which is located farthest from the main pole 15 among the yoke layer 31 and the first and second coupling parts 32 and 35 constituting the first return path section 30, is greater than the second shield 16B in length in the direction perpendicular to the medium facing surface 2. The first portion 10 of the coil passes through the space S1. According to the present embodiment, such a structure is more advantageous than a structure where the yoke layer 31 also functions as the second shield. That is, the present embodiment allows the second shield 16B and the main pole 15 to be in sufficiently close proximity to each other. This enhances the function of the second shield 16B.

Now, a description will be made as to the role of the first coupling part 32 (the magnetic layer 33). First, suppose a case where the first coupling part 32 is not provided and thus the second shield 16B and the yoke layer 31 are not magnetically coupled to each other. In this case, the magnetic flux that has been captured by the second shield 16B or the side shields 16C and 16D and directed downward cannot flow toward the yoke layer 31, and thus returns so as to proceed upward. This causes the second shield 16B or the side shields 16C and 16D to produce upwardly and downwardly directed magnetic fluxes. As a result, part of the magnetic flux captured by the second shield 16B or the side shields 16C and 16D leaks out of the medium facing surface 2. This may cause adjacent track erase. In contrast to this, if the second shield 16B and the yoke layer 31 are magnetically coupled to each other by the first coupling part 32, the magnetic flux captured by the side shields 16C and 16D is divided to flow upward and downward, and the magnetic flux captured by the second shield 16B is mainly directed downward. This can prevent the adjacent track erase that may be caused by part of the magnetic flux captured by the second shield 16B or the side shields 16C and 16D being leaked out of the medium facing surface 2.

If the second shield 16B is excessively long in the direction perpendicular to the medium facing surface 2 in the main cross section, flux leakage from the main pole 15 to the second shield 16B increases and the main pole 15 thus becomes unable to direct much magnetic flux to the medium facing surface 2. It is therefore necessary that the second shield 16B is not excessively long in the direction perpendicular to the medium facing surface 2 in the main cross section. In the main cross section, if the length of the magnetic layer 33 in the direction perpendicular to the medium facing surface 2 is equal to or smaller than that of the second shield 16B, the magnetic layer 33 (the first coupling part 32) cannot direct much magnetic flux from the second shield 16B to the yoke layer 31. In contrast to this, the present embodiment is configured so that in the main cross section, the magnetic layer 33 is greater than the second shield 16B and smaller than the yoke layer 31 in length in the direction perpendicular to the medium facing surface 2. Consequently, the present embodiment allows the magnetic layer 33 (the first coupling part 32) to direct much magnetic flux from the second shield 16B to the yoke layer 31.

The position of an end of a record bit to be recorded on the recording medium 100 depends on the position of an end of the end face of the main pole 15 located in the medium facing surface 2, the end being located forward along the direction T of travel of the recording medium 100. Accordingly, in order to define the position of the end of the record bit accurately, it is particularly important for the first shield 16A, of the first and second shields 16A and 16B, to be capable of capturing as much magnetic flux as possible. In the present embodiment, the first shield 16A is larger in volume than the second shield 16B and is thus capable of capturing more magnetic flux than the second shield 16B.

According to the present embodiment, it is possible by the foregoing operation of the heaters 82 and 92 to make the medium facing surface 2 protrude in part, so as to reduce the distance from the read head unit 8 and the write head unit 9 to the surface 100a of the recording medium 100. According to the present embodiment, it is also possible with the sensor 85 to detect contact of part of the medium facing surface 2 with the recording medium 100.

The sensor 85 needs to be disposed in the vicinity of the area of the medium facing surface 2 where the amount of protrusion is large. It is therefore preferred that in the vicinity of sensor 85 there exist a layer that makes a large amount of expansion toward the recording medium 100 when subjected to the heat generated by the heaters 82 and 92. Here, suppose a case where the whole of the end face of the first coupling part 32 facing toward the yoke layer 31 is in contact with the yoke layer 31 and the yoke layer 31 is firmly connected to the first coupling part 32. In this case, since the first coupling part 32 is smaller in volume than the yoke layer 31 and is surrounded by the insulating layer 54, the first coupling part 32 shows a smaller amount of expansion than the yoke layer 31. Since the yoke layer 31 is firmly connected to such a first coupling part 32, its expansion toward the recording medium is suppressed. In such a case, it is therefore difficult to control the distance from the read head unit 8 and the write head unit 9 to the surface 100a of the recording medium 100 and to detect contact of part of the medium facing surface 2 with the recording medium 100 effectively, even if the sensor 85 is disposed near the yoke layer 31.

In contrast, the present embodiment is configured so that the end face 32a of the first coupling part 32 facing toward the yoke layer 31 includes the middle portion 32a1 spaced from the yoke layer 31 and facing the yoke layer 31, and the two side portions 32a2 and 32a3 located on opposite sides of the middle portion 32a1 in the track width direction TW and in contact with the yoke layer 31. Thus, the yoke layer 31 is in contact with the two side portions 32a2 and 32a3 of the end face 32a of the first coupling part 32, but not with the middle portion 32a1 lying between the two side portions 32a2 and 32a3. Consequently, according to the present embodiment, it is possible to make the amount of expansion of at least a part of the yoke layer 31 (the part not in contact with the first coupling part 32) toward the recording medium 100 larger as compared with the case where the whole of the end face 32a of the first coupling part 32 is in contact with the yoke layer 31.

Furthermore, in the present embodiment, the sensor 85 is disposed between the yoke layer 31 and the middle portion 32a1 of the end face 32a of the first coupling part 32. That is, the sensor 85 is disposed near the part of the yoke layer 31 (the part not in contact with the first coupling part 32) that makes a large amount of expansion toward the recording medium 100.

Consequently, according to the present embodiment, it is possible to control the distance from the read head unit 8 and the write head unit 9 to the surface 100a of the recording medium 100 and to detect contact of part of the medium facing surface 2 with the recording medium 100, without hindrance to protrusion of part of the medium facing surface 2 even if the yoke layer 31 connected to the write shield 16 and the main pole 15 lies at a position backward of the main pole 15 along the direction T of travel of the recording medium 100.

Furthermore, the present embodiment is configured so that relative to the sensor 85, the first heater 82 is disposed backward along the direction T of travel of the recording medium 100 while the second heater 92 is disposed forward along the direction T of travel of the recording medium 100. According to the present embodiment, it is therefore possible to control the amount of protrusion of part of the medium facing surface 2 and the protruding shape of the medium facing surface 2 with higher accuracy than in a case where there is provided only a single heater.

As an example of the use of the sensor 85, a test using the sensor 85 will now be described. The test is performed, for example, prior to shipment of the magnetic disk drive product. In the test, the sensor 85 is measured for resistance while the magnetic head is moved over the entire surface 100a of the recording medium 100, with the amount of protrusion of part of the medium facing surface 2 resulting from the heaters 82 and 92 maintained constant. If the surface 100a of the recording medium 100 has any area with which part of the medium facing surface 2 comes into contact, that area is thereby detected. Performing such a test prior to shipment of the magnetic disk drive product serves to manufacture a product that is programmed to reduce the amount of protrusion of the part of the medium facing surface 2 when the magnetic head passes the area of contact detected by the test, so as to avoid contact.

The other effects provided by the present embodiment will now be described. In the present embodiment, the bottom end 15L of the main pole 15 includes the first portion 15L1, the second portion 15L2, and the third portion 15L3 that are contiguously arranged in order of increasing distance from the medium facing surface 2. The top surface 15T of the main pole 15 includes the fourth portion 15T1, the fifth portion 15T2, and the sixth portion 15T3 that are contiguously arranged in order of increasing distance from the medium facing surface 2. The distance from the top surface 1a of the substrate 1 to any given point on each of the first and second portions 15L1 and 15L2 decreases with increasing distance from the given point to the medium facing surface 2. The distance from the top surface 1a of the substrate 1 to any given point on each of the fourth and fifth portions 15T1 and 15T2 increases with increasing distance from the given point to the medium facing surface 2. Consequently, the present embodiment allows the main pole 15 to have a small thickness in the medium facing surface 2. It is thus possible to prevent the skew-induced adjacent track erase. The present embodiment further allows the main pole 15 to have a great thickness in the part away from the medium facing surface 2. This allows the main pole 15 to direct much magnetic flux to the medium facing surface 2, and consequently allows improving write characteristics such as overwrite property.

For the main pole 15 of the present embodiment, the angles of inclination $\theta_{L1}$ and $\theta_{T1}$ of the first and fourth portions 15L1 and 15T1 can be reduced to thereby suppress variations in write characteristics associated with changes in level of the medium facing surface 2. Furthermore, for the main pole 15, the angles of inclination $\theta_{L2}$ and $\theta_{T2}$ of the second and fifth portions 15L2 and 15T2 can be increased to thereby provide a great distance D2 between the third portion 15L3 and the sixth portion 15T3 while achieving a small thickness D1 of the main pole 15 in the medium facing surface 2 shown in FIG. 8. This allows preventing the skew-induced problems and improving write characteristics. Consequently, according to the present embodiment, it is possible to prevent the skew-induced problems and to improve write characteristics while suppressing variations in write characteristics associated with changes in level of the medium facing surface 2.

Second Embodiment

Figure 9:
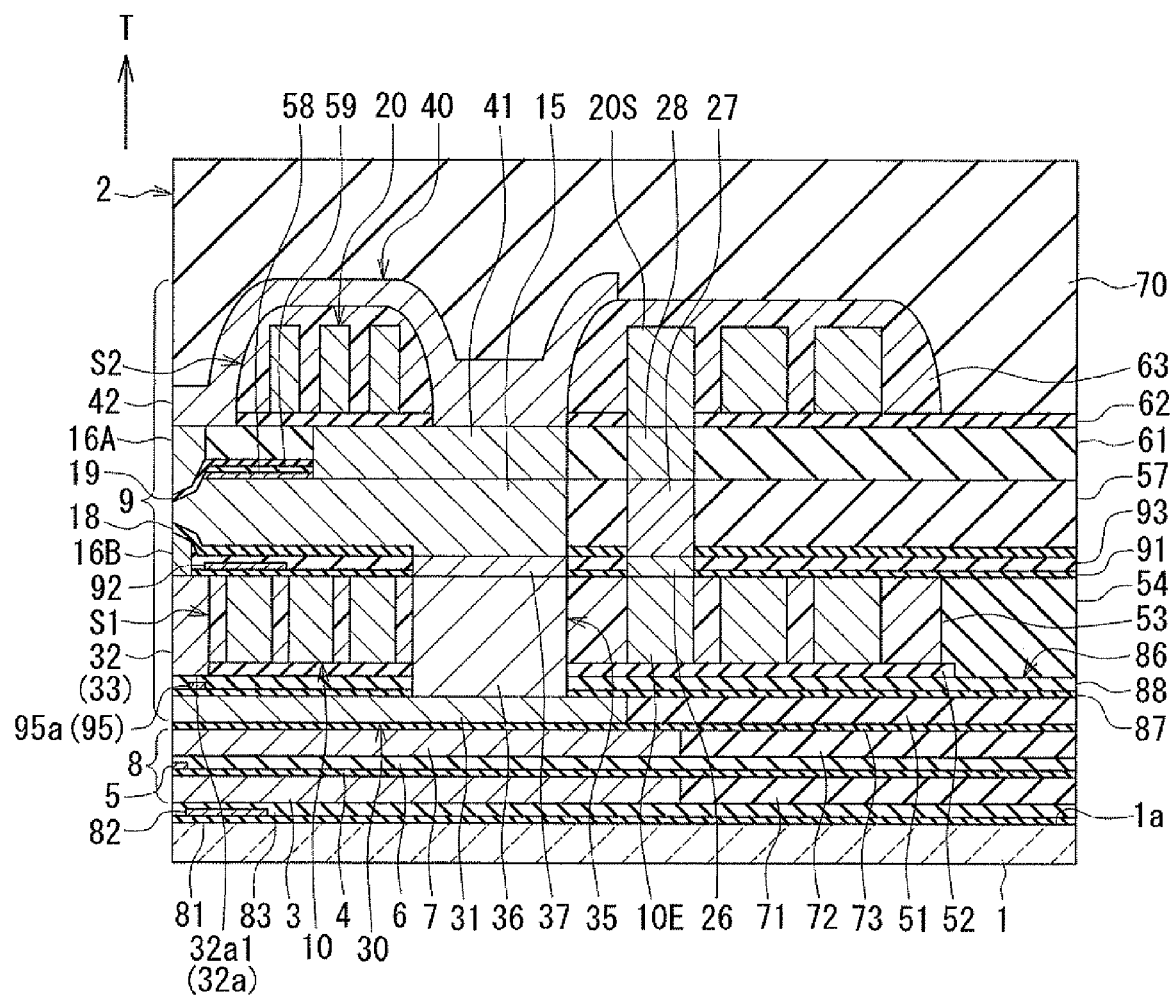
FIG. 9 is a cross-sectional view of a magnetic head according to a second embodiment of the invention.
Figure 10:
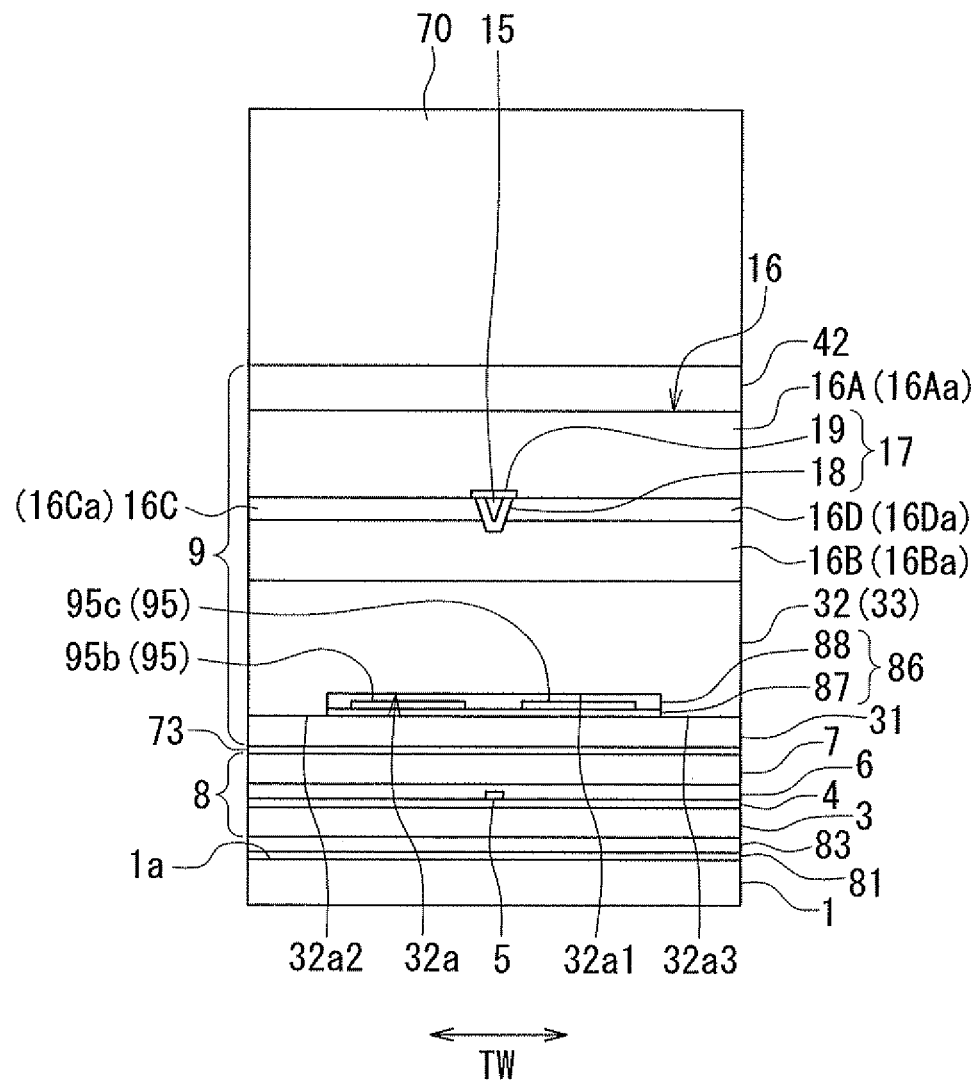
FIG. 10 is a front view showing the medium facing surface of the magnetic head according to the second embodiment of the invention.
Figure 11:
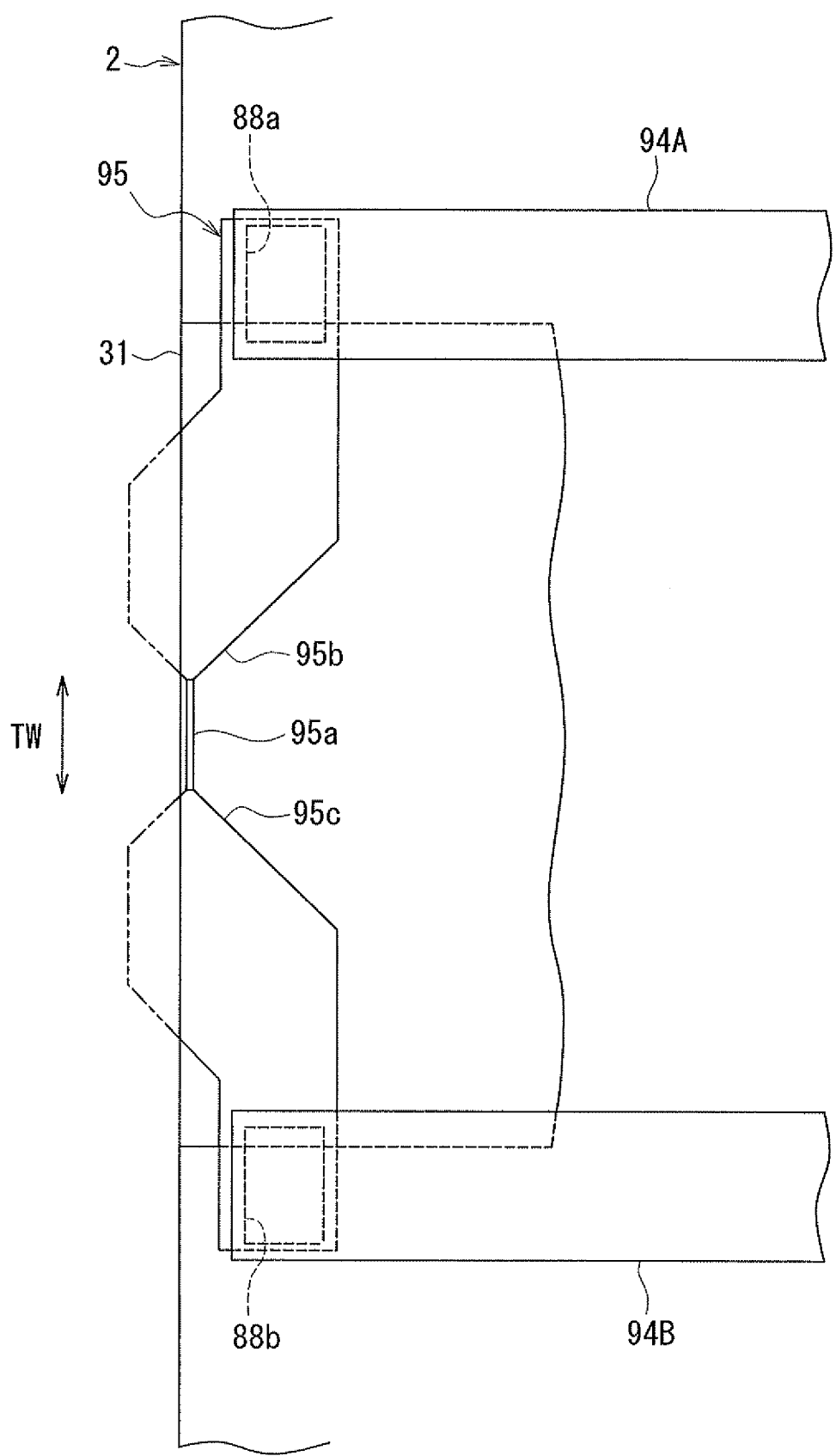
FIG. 11 is a plan view showing a sensor of the magnetic head according to the second embodiment of the invention.

A magnetic head according to a second embodiment of the invention will now be described with reference to FIG. 9 to FIG. 11. FIG. 9 is a cross-sectional view of the magnetic head according to the present embodiment. FIG. 9 shows a cross section perpendicular to the medium facing surface and the top surface of the substrate, or the main cross section, in particular. FIG. 10 is a front view showing the medium facing surface of the magnetic head according to the present embodiment. FIG. 11 is a plan view showing a sensor of the magnetic head according to the present embodiment.

The magnetic head according to the present embodiment is different from the magnetic head according to the first embodiment in the following respects. The magnetic head according to the present embodiment has a sensor 95 shaped as shown in FIG. 11, instead of the sensor 85 of the first embodiment. The sensor 95 has a detection part 95a and connection parts 95b and 95c.

The shapes and arrangement of the detection part 95a and the connection parts 95b and 95c are basically the same as those of the detection part 85a and the connection parts 85b and 85c of the first embodiment. In the present embodiment, however, the detection part 95a is not exposed in the medium facing surface 2. Such a configuration of the sensor 95 is determined when the medium facing surface 2 is formed by polishing in the process of manufacturing the magnetic head, as in the first embodiment. Specifically, in the process of manufacturing the magnetic head, a preliminary sensor layer including a part to be the sensor 95 is formed. The preliminary sensor layer is polished when forming the medium facing surface 2, and its remaining part makes the sensor 95. In FIG. 11, the part of the preliminary sensor layer removed by polishing during the formation of the medium facing surface 2 is shown by the chain double-dashed lines. In the present embodiment, the aforementioned polishing will not cause the detection part 95a to be exposed in the medium facing surface 2. Therefore, even if there is a change in level of the medium facing surface 2 to be formed by polishing, the length of the detection part 95a in the direction perpendicular to the medium facing surface 2 remains constant. Consequently, according to the present embodiment, it is possible to prevent the detection part 95a from varying in resistance due to a change in level of the medium facing surface 2.

The remainder of configuration, function and effects of the present embodiment are similar to those of the first embodiment.

Third Embodiment

Figure 12:
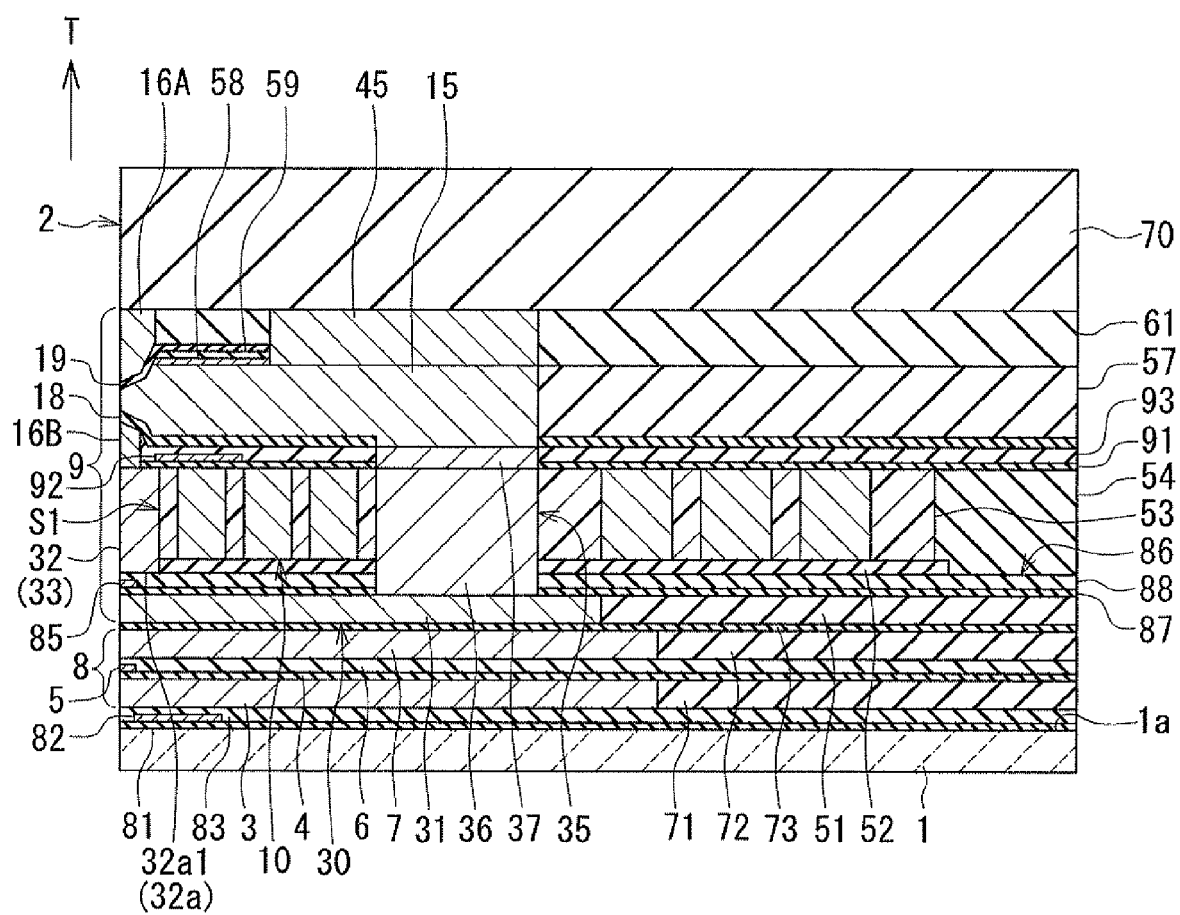
FIG. 12 is a cross-sectional view of a magnetic head according to a third embodiment of the invention.
Figure 13:
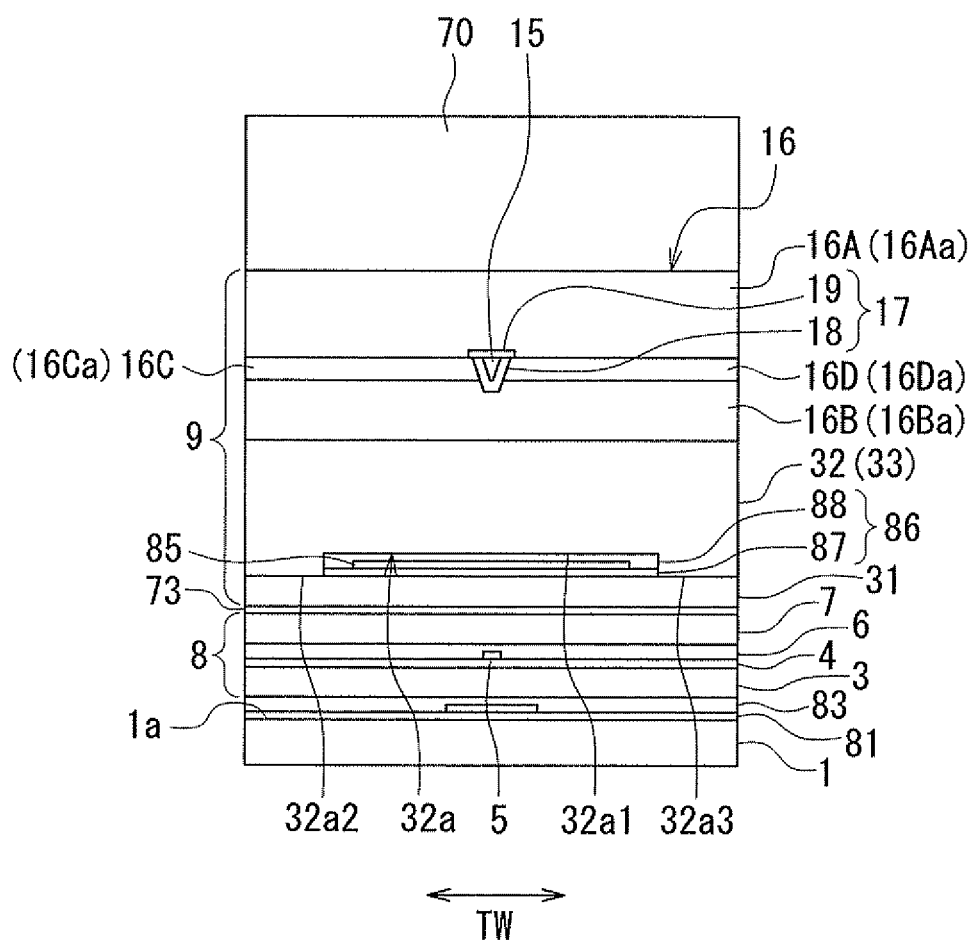
FIG. 13 is a front view showing the medium facing surface of the magnetic head according to the third embodiment of the invention.

A magnetic head according to a third embodiment of the invention will now be described with reference to FIG. 12 and FIG. 13. FIG. 12 is a cross-sectional view of the magnetic head according to the present embodiment. FIG. 12 shows a cross section perpendicular to the medium facing surface and the top surface of the substrate, or the main cross section, in particular. FIG. 13 is a front view showing the medium facing surface of the magnetic head according to the present embodiment.

The magnetic head according to the present embodiment is different from the magnetic head according to the first embodiment in the following respects. In the magnetic head according to the present embodiment, the write head unit 9 has a yoke layer 45 instead of the second return path section 40. The shape and position of the yoke layer 45 are the same as those of the yoke layer 41 of the first embodiment. The yoke layer 45 is made of a magnetic material. Examples of materials that can be used for the yoke layer 45 include CoFeN, CoNiFe, NiFe, and CoFe.

The magnetic head according to the present embodiment is without the second portion 20 of the coil, the connection layers 26 to 28 and the insulating layers 62 and 63. In the present embodiment, a not-shown lead layer is electrically connected to the coil connection part 10E of the first portion 10 of the coil.

FIG. 12 and FIG. 13 show an example where the magnetic head according to the present embodiment has the sensor 85 described in the first embodiment. However, the magnetic head according to the present embodiment may have the sensor 95 described in the second embodiment, instead of the sensor 85.

The remainder of configuration, function and effects of the present embodiment are similar to those of the first or second embodiment.

Fourth Embodiment

Figure 14:
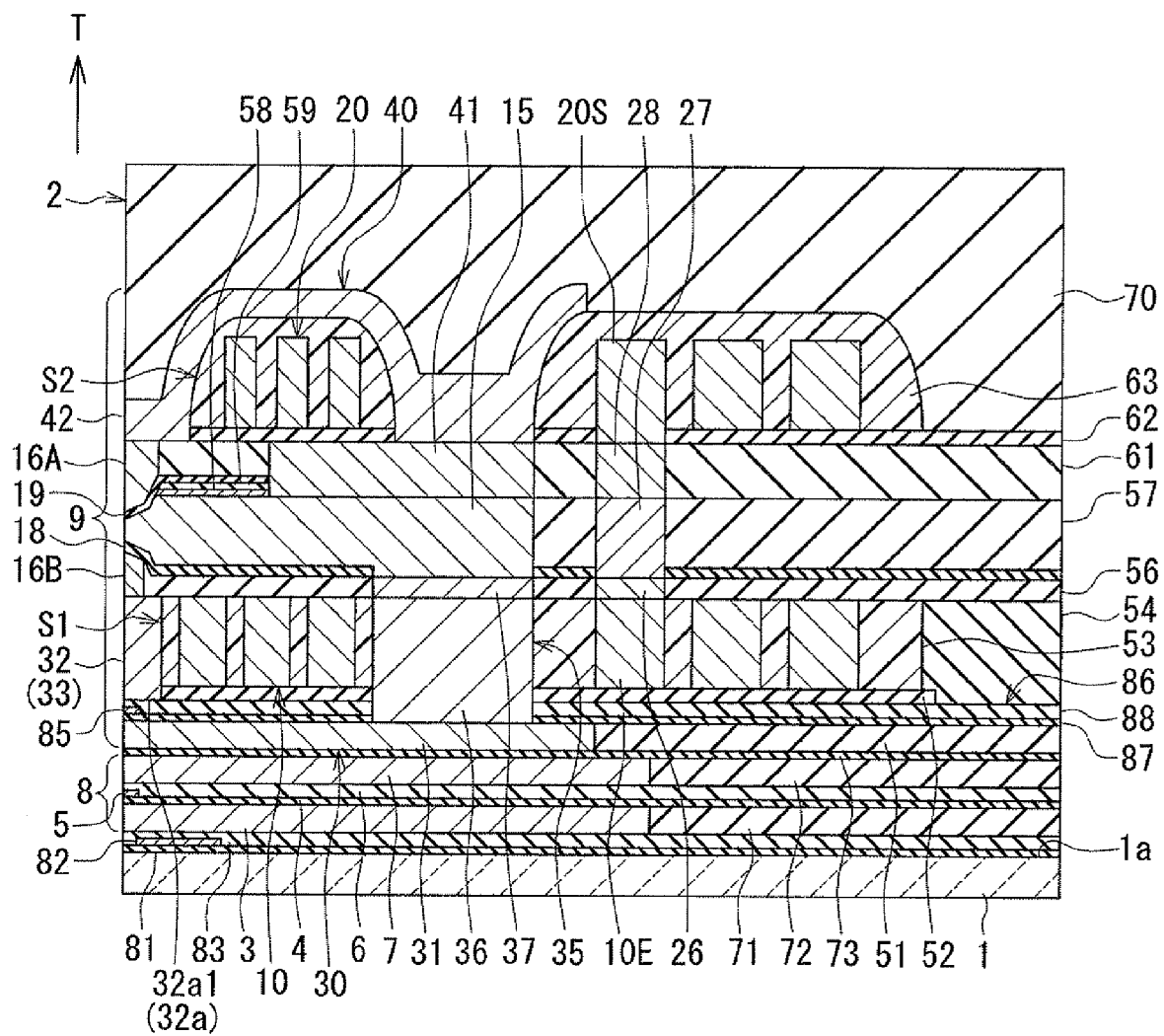
FIG. 14 is a cross-sectional view of a magnetic head according to a fourth embodiment of the invention.

A magnetic head according to a fourth embodiment of the invention will now be described with reference to FIG. 14. FIG. 14 is a cross-sectional view of the magnetic head according to the present embodiment. FIG. 14 shows a cross section perpendicular to the medium facing surface and the top surface of the substrate, or the main cross section, in particular.

The magnetic head according to the present embodiment is different from the magnetic head according to the first embodiment in the following respects. The magnetic head according to the present embodiment is without the second heater 92. The magnetic head according to the present embodiment has an insulating layer 56 made of an insulating material, instead of the insulating layers 91 and 93. The insulating layer 56 is made of alumina, for example.

FIG. 14 shows an example where the magnetic head according to the present embodiment has the sensor 85 described in the first embodiment. However, the magnetic head according to the present embodiment may have the sensor 95 described in the second embodiment, instead of the sensor 85.

The remainder of configuration, function and effects of the present embodiment are similar to those of the first or second embodiment.

The present invention is not limited to the foregoing embodiments, and various modifications may be made thereto. For example, the shapes and arrangement of the heaters 82 and 92 are not limited to those described in the first embodiment. The sensor of the present invention is not limited to a resistor that varies in resistance with a change in temperature. Any sensor may be used as long as it can detect contact of part of the medium facing surface with the recording medium.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
    a medium facing surface that faces a recording medium;
    a coil that produces a magnetic field corresponding to data to be written on the recording medium; and
    a main pole that has an end face located in the medium facing surface, allows a magnetic flux corresponding to the magnetic field produced by the coil to pass, and produces a write magnetic field for writing the data on the recording medium by means of a perpendicular magnetic recording system;
    a write shield made of a magnetic material and having an end face located in the medium facing surface;
    a gap part made of a nonmagnetic material and disposed between the main pole and the write shield;
    a first return path section made of a magnetic material;
    at least one heater that generates heat for making part of the medium facing surface protrude; and
    a sensor that detects contact of the part of the medium facing surface with the recording medium, wherein:
    the end face of the write shield includes a first end face portion located forward of the end face of the main pole along a direction of travel of the recording medium;
    the first return path section includes: a yoke layer located backward of the main pole along the direction of travel of the recording medium; a first coupling part that couples the yoke layer and the write shield to each other; and a second coupling part that is located away from the medium facing surface and couples the yoke layer and the main pole to each other;
    the first coupling part has an end face facing toward the yoke layer;
    the end face of the first coupling part includes a middle portion that is spaced from the yoke layer and faces the yoke layer, and two side portions that are located on opposite sides of the middle portion in a track width direction and in contact with the yoke layer; and
    the sensor is located between the yoke layer and the middle portion of the end face of the first coupling part.

2. The magnetic head for perpendicular magnetic recording according to claim 1, wherein:
    the magnetic head includes a first space defined by the main pole, the gap part, the write shield and the first return path section; and
    the coil includes a first portion passing through the first space.

3. The magnetic head for perpendicular magnetic recording according to claim 1, further comprising a second return path section made of a magnetic material,
    wherein the second return path section has an end face that is located away from the medium facing surface and in contact with the main pole, the second return path section being located forward of the main pole along the direction of travel of the recording medium and connecting the write shield and the main pole to each other.

4. The magnetic head for perpendicular magnetic recording according to claim 3, wherein:
    the magnetic head includes a first space defined by the main pole, the gap part, the write shield and the first return path section, and a second space defined by the main pole, the gap part, the write shield and the second return path section; and
    the coil includes a first portion passing through the first space and a second portion passing through the second space.

5. The magnetic head for perpendicular magnetic recording according to claim 1, wherein the end face of the write shield further includes a second, a third, and a fourth end face portion, the second end face portion being located backward of the end face of the main pole along the direction of travel of the recording medium, the third and fourth end face portions being located on opposite sides of the end face of the main pole in the track width direction.

6. The magnetic head for perpendicular magnetic recording according to claim 1, wherein the sensor is a resistor that varies in resistance with a change in its own temperature which occurs when part of the medium facing surface makes contact with the recording medium.

7. The magnetic head for perpendicular magnetic recording according to claim 1, wherein the at least one heater includes a first heater that is located backward of the sensor along the direction of travel of the recording medium.

8. The magnetic head for perpendicular magnetic recording according to claim 7, wherein the at least one heater further includes a second heater that is located forward of the sensor along the direction of travel of the recording medium.

9. The magnetic head for perpendicular magnetic recording according to claim 1, further comprising a read head unit located backward of the yoke layer along the direction of travel of the recording medium, the read head unit including a read element that reads data written on the recording medium, and first and second read shield layers that are disposed such that the read element is interposed therebetween.

* * * * *